United States Patent [19]

Haubner et al.

[11] Patent Number: 6,057,849
[45] Date of Patent: May 2, 2000

[54] METHOD OF DISPLAYING GEOMETRIC OBJECT SURFACES

[75] Inventors: Michael Haubner; Karl-Hans Englmeier, both of Munich, Germany

[73] Assignee: GSF-Forschungszentrum fuer Umwelt und Gesundheit GmbH, Oberschleissheim, Germany

[21] Appl. No.: 08/927,839

[22] Filed: Sep. 11, 1997

[30] Foreign Application Priority Data

Sep. 13, 1996 [DE] Germany .............. 196 37 463

[51] Int. Cl.$^7$ ...................................... G06T 7/40
[52] U.S. Cl. .................... 345/428; 345/420; 345/430; 345/508
[58] Field of Search ................... 345/418, 419, 345/420, 428–433, 507–508

[56] References Cited

U.S. PATENT DOCUMENTS

| | | | |
|---|---|---|---|
| 4,692,880 | 9/1987 | Merz et al. ............................... | 345/430 |
| 5,442,733 | 8/1995 | Kaufman et al. ........................ | 395/124 |
| 5,454,068 | 9/1995 | Ramanujam ............................ | 395/119 |
| 5,517,602 | 5/1996 | Natarajan ................................ | 395/119 |

*Primary Examiner*—Mark K. Zimmerman
*Assistant Examiner*—Chanté E. Harrison
*Attorney, Agent, or Firm*—Skjerven, Morrill, MacPherson, Franklin & Friel LLP; Alan H. MacPherson

[57] ABSTRACT

Geometric surfaces of objects are displayed by a method which generates surface data of at least one object and stores this surface data in a first memory, generates data records for all surface data stored in the first memory and stores these data records in a second memory, generates additional surface data for the representation of object segments with a lower level of detail and stores this additional surface data in the first memory, generates and stores a hierarchical data structure with several data records addressable via pointer addresses to represent one part of the objects surface in the second memory, stores the pointer addresses of the data records stored in the second memory which are not referenced by any pointer addresses stored in other data records, computes in a arithmetic unit a minimum level of detail for representation of the object segment, compares the computed minimum level of detail for each data record whose address is stored in a third memory area with the level of detail stored in the data record, evaluates the results of the comparison for each data record, with the pointer addresses referencing surface data elements of the data records having a stored level of detail which is at least equal to the computed minimum level of detail being copied into a fourth memory area and with the pointer addresses stored in the other data records being copied into said third memory and erasing the pointer addresses referencing the data record from the third memory, and outputting the surface data elements addressed in the fourth memory area to an output device for geometric display of the object.

11 Claims, 20 Drawing Sheets

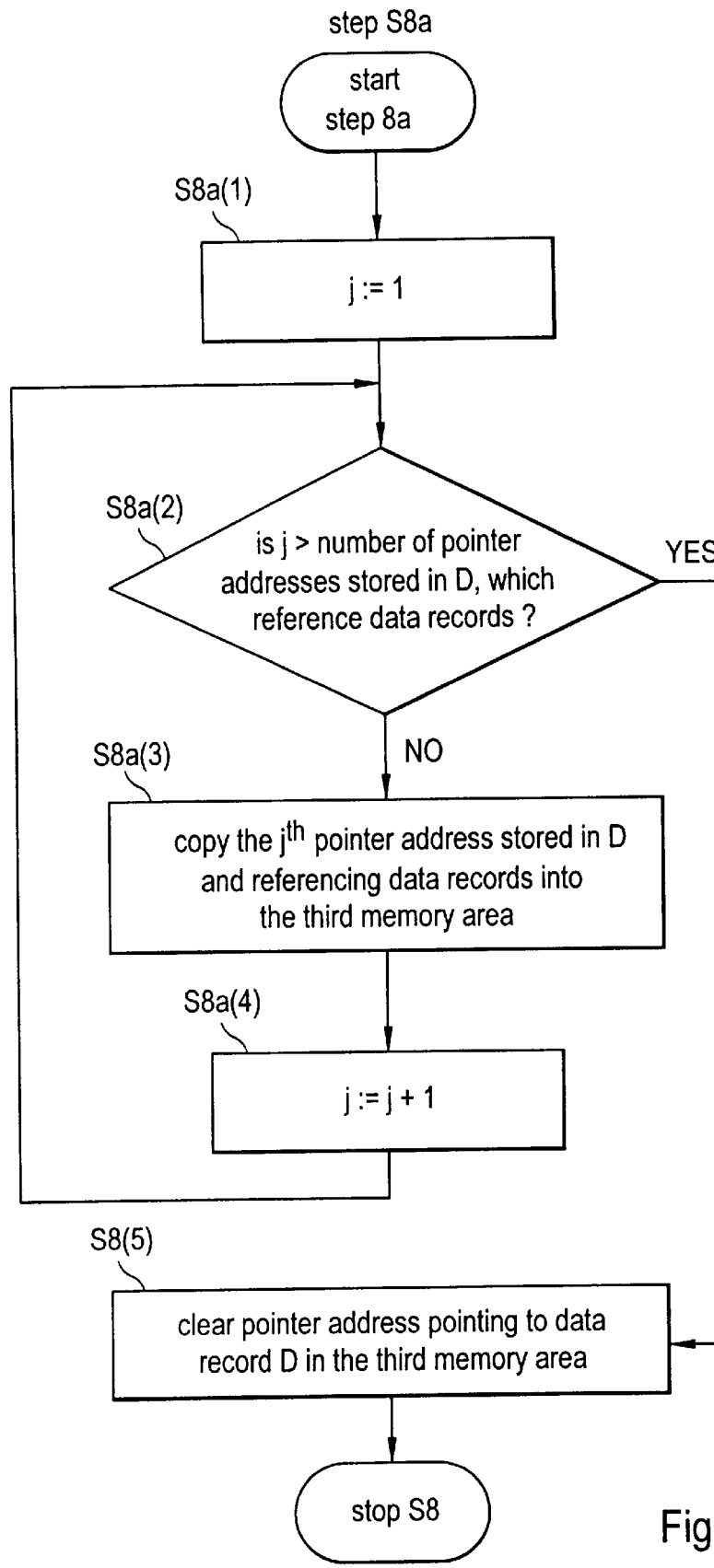
Fig.2i(1)

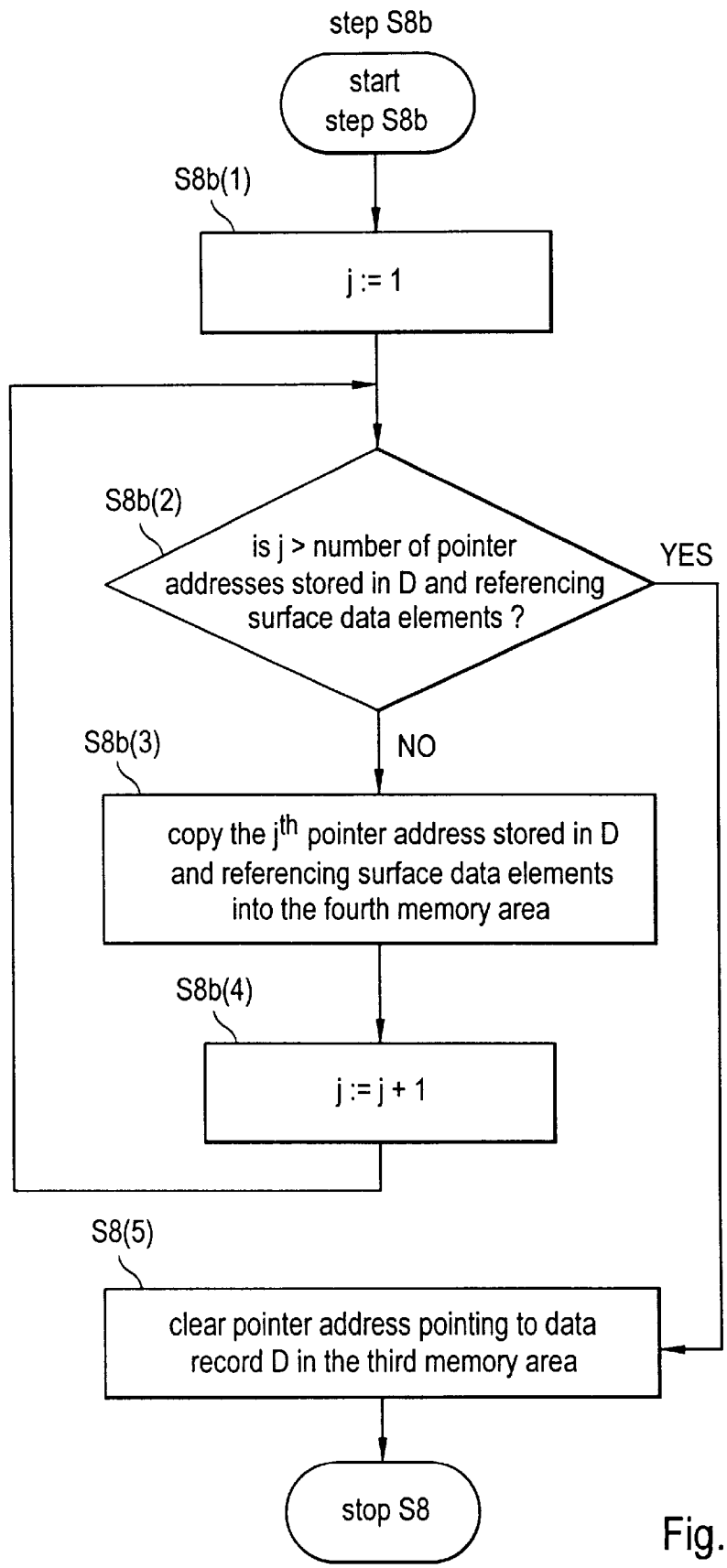
Fig.2i(2)

Situation execution of steps S1 and S2 (Figs.2b,2c)

Fig.3a  reduced surface detail

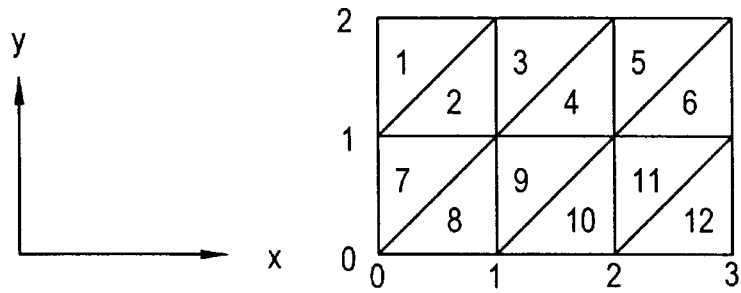

Fig.3b  hierarchical data structure

| 1.0 | 2.0 | 3.0 | 4.0 | 5.0 | 6.0 | 7.0 | 8.0 | 9.0 | 10.0 | 11.0 | 12.0 |

Fig.3c  stored data

| first memory area | | |
|---|---|---|
| 0000 | 12 | number of surface data elements |
| 0001 | 3, (0,1), (1,2), (0,2) | surface data element 1 |
| : | : | : |
| 0012 | 3, (2,0), (3,0), (3,1) | surface data element 12 |

| second memory area | | |
|---|---|---|
| 0000 | 12 | number of data records |
| 0001 | 1, 0001, 0, 0 | data record 1 |
| : | : | : |
| 0012 | 1, 0012, 0, 0 | data record 12 |

| third memory area | | |
|---|---|---|
| 0000 | 0 | number of pointer addresses |

| fourth memory area | | |
|---|---|---|
| 0000 | 0 | number of pointer addresses |

Situation after execution of the first iteration of
S3 and S4 (Figs. 2d,2e)

Fig.4a  reduced surface detail

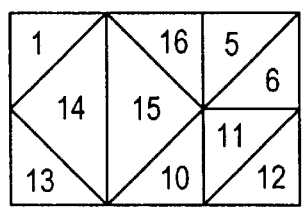

Fig.4b  hierarchical data structure

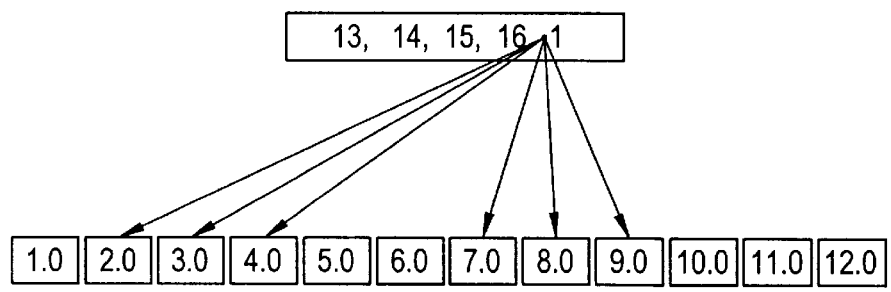

Fig.4c  stored data

| first memory area | | |
|---|---|---|
| 0000 | 16 | number of surface data elements |
| 0001 | 3, (0,1), (1,2), (0,2) | surface data element 1 |
| : | : | : |
| 0012 | 3, (0,0), (1,0), (0,1) | surface data element 12 |
| 0013 | 3, (0,0), (1,0), (0,1) | surface data element 13 |
| : | : | : |
| 0016 | 3, (2,1), (2,2), (1,2) | surface data element 16 |

| second memory area | | |
|---|---|---|
| 0000 | 13 | number of data records |
| 0001 | 1, 0001, 0, 0 | data record 1 |
| : | : | : |
| 0012 | 1, 0012, 0, 0 | data record 12 |
| 0013 | 4, 0013, 0014, 0015, 0016<br>6, 0002, 0003, 0004, 0007, 0008, 0009, 1 | data record 13 |

Situation after execution of the second iteration of S3 and S4 (Figs. 2d,2e)

Fig.5a  reduced surface detail

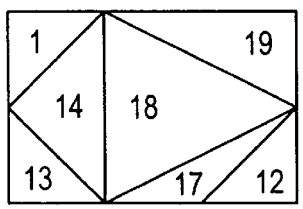

Fig.5b  hierarchical data structure

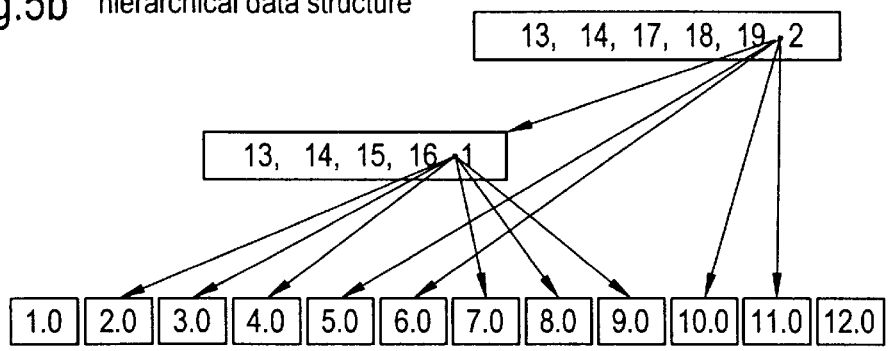

Fig.5c  stored data

| first memory area | | |
|---|---|---|
| 0000 | 19 | number of surface data elements |
| 0001 | 3, (0,1), (1,2), (0,2) | surface data element 1 |
| ⋮ | ⋮ | ⋮ |
| 0016 | 3, (2,1), (2,2), (1,2) | surface data element 16 |
| 0017 | 3, (1,0), (2,0), (3,1) | surface data element 17 |
| 0018 | 3, (1,0), (3,1), (1,2) | surface data element 18 |
| 0019 | 3, (3,1), (3,2), (1,2) | surface data element 19 |

| second memory area | | |
|---|---|---|
| 0000 | 14 | number of data records |
| 0001 | 1, 0001, 0, 0 | data record 1 |
| ⋮ | ⋮ | ⋮ |
| 0013 | 4, 0013, 0014, 0015, 0016, 6, 0002, 0003, 0004, 0007, 0008, 0009, 1 | data record 13 |
| 0014 | 5, 0013, 0014, 0017, 0018, 0019, 5, 0005, 0006, 0010, 0011, 0013, 2 | data record 14 |

Situation after execution of step S5 (Fig.2f)
Fig.6a  reduced surface detail
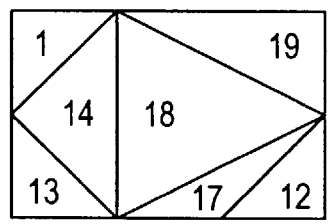
Fig.6b  hierarchical data structure
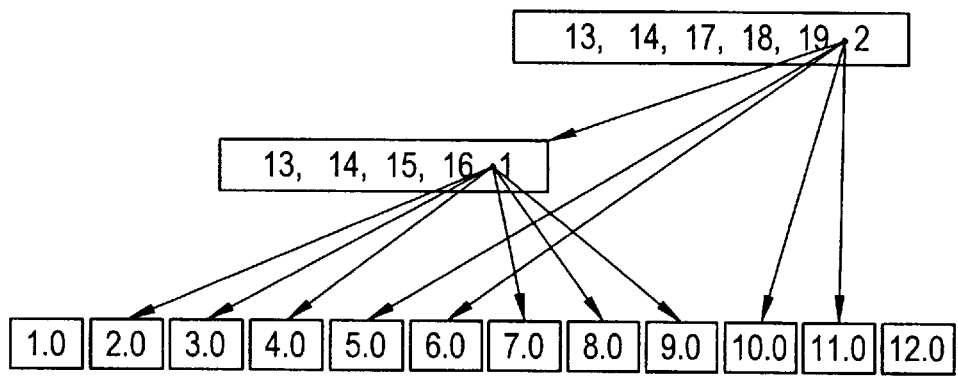
Fig.6c  stored data
| first memory area: no change | | |
|---|---|---|
| : | : | : |
| second memory area: no change | | |
|---|---|---|
| : | : | : |
| third memory area | | |
|---|---|---|
| 0000 | 3 | number of pointer addresses |
| 0001 | 0001 | pointer address of data record 1 |
| 0002 | 0012 | pointer address of data record 12 |
| 0003 | 0014 | pointer address of data record 14 |

Situation after execution of the first iteration of steps
S6, S7, S8 (Figs. 2g, 2h, 2i)

Fig.7a  set-up surface detail (surfaces referenced by memory area 4)

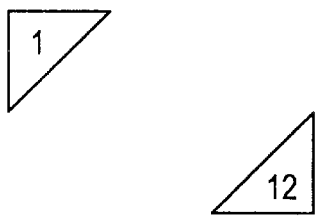

Fig.7b  stored data

| first memory area: no change | | |
|---|---|---|
| : | : | : |

| second memory area: no change | | |
|---|---|---|
| : | : | : |

| third memory area | | |
|---|---|---|
| 0000 | 5 | number of pointer addresses |
| 0001 | 0005 | pointer address of data record 5 |
| 0002 | 0006 | pointer address of data record 6 |
| 0003 | 0010 | pointer address of data record 10 |
| 0004 | 0011 | pointer address of data record 11 |
| 0005 | 0013 | pointer address of data record 13 |

| fourth memory area | | |
|---|---|---|
| 0000 | 2 | number of pointer addresses |
| 0001 | 0001 | pointer address of surface element 1 |
| 0002 | 0012 | pointer address of surface element 12 |

Situation after execution of the second iteration of steps S5, S6, S7

Fig.8a  set-up surface detail (surfaces referenced by memory area 4)

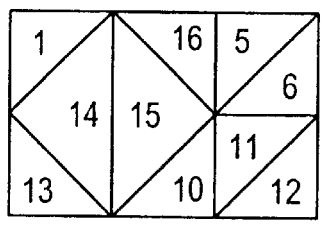

Fig.8b  stored data

| first memory area: no change | | |
|---|---|---|
| : | : | : |

| second memory area: no change | | |
|---|---|---|
| : | : | : |

| third memory area | | |
|---|---|---|
| 0000 | 0 | number of pointer addresses |

| fourth memory area | | |
|---|---|---|
| 0000 | 2 | number of pointer addresses |
| 0001 | 0001 | pointer address of surface element 1 |
| 0002 | 0012 | pointer address of surface element 12 |
| 0003 | 0005 | pointer address of surface element 5 |
| 0004 | 0006 | pointer address of surface element 6 |
| 0005 | 0010 | pointer address of surface element 10 |
| 0006 | 0011 | pointer address of surface element 11 |
| 0007 | 0013 | pointer address of surface element 13 |
| 0008 | 0014 | pointer address of surface element 14 |
| 0009 | 0015 | pointer address of surface element 15 |
| 0010 | 0016 | pointer address of surface element 16 |

METHOD OF DISPLAYING GEOMETRIC OBJECT SURFACES

The invention relates to method of displaying geometric object surfaces on an output device of variable level of detail.

Methods operating on three-dimensional graphics occur over a wide range of applications such as CAD, visual display of medical or industrial 3-D scanner data, flight and driving simulations or the representation of complex economic relationships. One of the most important basic elements for the representation of three-dimensional objects is the polygon. The triangle is the simplest form of a polygon. Object surfaces may be described with almost optional accuracy by fine grids formed, for instance, by triangles. The image display rate is of particular importance for such geometric object surfaces. In this respect three categories are distinguished, i.e. non-interactive display methods, interactive display methods and immersive display methods. In the non-interactive display methods the computer graphics or the geometric representation, respectively, need not be computed within a predetermined time interval; for instance in film productions the computation interval may be as long as several weeks or months. In the interactive display methods it must be possible to permit interactive working with the three-dimensional objects. To this end three image displays per second must be computed and displayed or else the relationship between the user's entry, e.g. by movement of a mouse, and the response, e.g. rotation of the object, will be lost. One example of interactive display methods are the common CAD applications. The third category of display methods are the immersive image display methods. With these methods the three-dimensional image must be displayed so rapidly that the observer gets the impression of a smooth movement. This effect is achieved with 15 and more images per second. Immersive display methods must be applied in applications including those of virtual reality, e.g. in driving and flight simulations.

The interactive image display methods and equally the immersive display methods are so-called real-time display methods. If, for instance, a computer of medium performance is to be used for immersive image display the objects contained in the image altogether must not include more than a certain number of grid triangles. The efficiency of the computer sets therefore a limit to the accuracy with which the object is represented. In the common LOD method (level of detail) several geometric specifications are prepared, before the display of the object begins, which are distinguished in terms of level of detail and hence also in terms of complexity. In three-dimensional image displays a certain geometric display representation is then selected as a function of specific criteria. For instance, small objects far remote from the observer are displayed only very inaccurately so that a sufficient computing capacity will be available for the accurate display of important objects or object segments, respectively.

For the computer-assisted display of three-dimensional objects the objects are stored in the form of geometric surface specifications. In such an approach the object surface is approximated by a network of surface parts or polygons. The geometric surface grids are generated either by interactive design methods or automatic design methods.

In the interactive design methods the user defines the object directly in a geometric shape. The user designs the geometric grid directly. Therefore, the objects resulting from these interactive design methods present a comparatively low complexity as a rule because this designing mode is highly time-consuming. Automatic design methods require a given object specification, e.g. in the form of segmented three-dimensional scanner data. For a representation of this data the object surfaces are automatically extracted and described by grid systems. In the majority of the methods employed to implement these processing steps involve the attempt to generate an approximation with a maximum of accuracy. Therefore very substantial quantities of grid triangles are normally created in the automatic design methods. Common methods of designing geometric object specifications on the basis of tomographic images are described, for instance, in ACM Computergraphics, 21 (4), pages 163 to 169, 1987, William E. Lorensen and H. E. Cline "Marching Cubes: a high-resolution 3D surface construction algorithm". This method is employed in a great number of medical and industrial programme systems.

Despite the high efficiency of advanced graphics hardware it is not always possible to generate three-dimensional displays of complex objects in real time. This applies to interactive and particularly immersive display methods. Therefore the surface specification must be simplified in these display methods by limiting the object by a fairly small number of geometric prime elements or polygons. The employed reduction methods may be subdivided into two groups. The so-called global methods generate entirely new surface specifications whilst the local methods operate on an iterative approach to simplify local areas of the surface, e.g. by amalgamation of surfaces. Common reduction methods are described, for instance, in Carl Erikson "Polygonal simplification: An overview, Technical Report, Department of Computer Science, UNC Chapel Hill, 1996".

The common reduction methods result, on the one hand, in a simplification of a geometric surface, but in almost all cases also in a loss or misrepresentation of information. The reduction methods convert the original display, in which the object surface is represented by a great number of small polygons, into a representation which describes the object surface by a small number of larger polygons. The converted geometric representation is not exactly congruent with the original specification. In many applications, e.g. in medicine or in industrial quality control, such misrepresentations caused by the reduction method are, however, unacceptable. It is therefore common to create several geometric specifications of one object which present different levels of detail. The three-dimensional representation of the object is then controlled by the so-called level-of-detail (LOD) method as it is described, for instance, in J. Clark "Hierarchical geometric models for the visible surface algorithm" in: Communications of the ACM 19 (10), pp. 547 to 554, October 1976". In that approach a level of detail or accuracy is selected during the displaying process as a function of the relevance of the respective object. The relevance is determined, for instance, on the basis of the distance between the observer and the object, of the observer's focusing, or of specific object properties such as pathologic changes on body tissue. As these values may vary in the course of time these so-called LOD criteria must be evaluated for each image to be displayed and for each object represented in the image. In order to prevent sudden transitions between two display representations it is possible to provide for a transparent fade-over as it is described, for instance, by John Rohlf and James Helman "Iris Performer: a high-performance multiprocessing toolkit for real-time 3-D graphics" in: ACM Computer Graphics Proceedings, Annual Conference series, 1994.

In the "progressive-meshes" methods described by Hugues Hoppe in: ACM Computer Graphics Proceedings, Annual Conference series, 1996, a geometric object is represented by a strongly simplified basic shape in combination with a linear list. Each of the elements on the list contains local refinements, which means, for instance, that two adjacent triangles are replaced by four smaller triangles. With a controlled execution of refining steps in the visual display or representation this method can hence achieve a practically optional level of detail.

A combination of reduction methods in which several object specifications of different levels of detail are computed before they are visually displayed with LOD methods for the selection of one image display per object presents definite disadvantages. On account of the high local resolution of advanced 3-D scanners and in view of the ever-increasing demands on computer-assisted simulation, design and visual display methods in terms of reality or level of detail, respectively, the complexity of the objects to be displayed is continuously growing. The methods so far common are restricted to a previously computed specification with a constant precision per object. With the exception of the aforementioned progressive-meshes method non of the methods so far mentioned allows for a variation of the level of detail along the object surface. The invariance of the level of detail along the object surface produces the following detrimental effects:

In the common methods the object specification to be displayed is determined by an evaluation of the LOD criteria. As the size of the object increases the less it is possible to approximate the object relevance successfully by a single value. As the majority of the dynamic LOD criteria, e.g. the distance between the observer and the object, keep varying along the object surface and as in the known methods only one level of detail may be selected such an approach results in the situation that the majority of the object areas cannot be displayed with the accuracy which is obtained when the LOD criteria are evaluated for this area. As a result of the excessively detailed display of less relevant object segments computing capacity is wasted, and an inaccurate representation of the important parts of the object leads to a visual display which might furnish incorrect information.

Even though invisible rear sides of the object are not relevant for the creation of a three-dimensional visual display of non-transparent objects the methods of the present state of the art do not provide any possibility to take this fact, too, into consideration in the LOD selection. Even though invisible parts of surfaces, i.e. parts turned away from the observer, are detected and not displayed by the graphics hardware this feature hardly results in a reduction of the computing times on account of the pipeline architecture in the majority of implemented applications. If, for instance, an object is rated to have at a very high level of relevance or importance, because it is very close to the observer or because it is located in the centre of a screen, the loss of computing capacity is very high due to the invisible polygons or surface segments. Another particularly serious disadvantage of the state-of-the-art methods consists in the aspect that if the displaying efficiency of a particular computer is insufficient for the visual display of an object specification with a maximum level of detail within the given time interval a variation from the intended image repetition rate is required, which may lead to dramatic consequences, depending on the respective application. In order to prevent a variation from the intended image repetition rate an attempt may therefore be made to disintegrate the object statically into object segments prior to reduction. This method, however, entails the distinct disadvantage that the areas in the margins of the object segments, i.e. the locations where the object segments contact each other, must be precluded from reduction or else gaps will be created in the object surface when two contiguous object segments are drawn with different levels of detail. This produces a particularly negative effect on the achievable reduction rates and prevents, above all, that very small segment areas can be selected. Moreover, such a static object subdivision prevents an adaptation of the boundaries between two areas of different levels of detail during the process of visual display.

The weak point in the progressive-meshes method consists in the fact that the majority of real-time applications is not supported. The reason for this is the linear structure of the refinement list. As this linear list structure permits sequential processing only it is necessary to go through the complete list for a representation of an object with variable level of detail. When complex geometric objects are displayed with a large number of surfaces, in particular, this run through the complete refinement list means a very high expenditure in terms of computation in the known progressive-meshes method, with the consequence that on most systems the real-time capability is lost. Independently of whether an object segment has been detected earlier already to present a sufficient accuracy the list elements then following must be processed for a refinement of these object segments in the ongoing processing operation, arriving at the mere finding that any further refinement of the particular object segment is no longer necessary. Another disadvantage of the progressive-meshes method consists in the aspect that there are interdependencies among the data between the individual steps of the refinement list, which enforce sequential processing. This means that the high computing load cannot be efficiently distributed among several processors.

The known progressive-meshes method has a low processing flexibility as neither the definition or a minimum level of detail permitted nor the definition of a maximum level of detail required in the visual display of the object reduces the amount of work involved in list processing. Another disadvantage of the progressive-meshes method consists in the aspect that a hierarchical visibility decision is impossible. If, for instance, it is established at one refinement step within the linear list that the corresponding object segment is not visible this information cannot be used in the on-going course of the procedure in order to expedite processing.

The invention is therefore based on the problem of providing a method in which the aforementioned disadvantages are avoided and which permits a significant redact of the object complexity while it displays at the same time relevant object segments with a maximum of detail.

This problem is solved by a method presenting the features defined in Patent claim 1 or 2, Other expedient embodiments and improvements of the invention are apparent from the dependent claims.

One advantage of the inventive method is the fact that due to the set-up of a hierarchical data structure the processing of a sub-tree may be omitted as soon as the required level of detail is reached. The hierarchical data structure permits moreover the efficient parallelisation of processing. The inventive hierarchical data structure makes it possible to decide, on the basis of surface groups, whether a respective object segment is visible. Another advantage of the method therefore consists in the aspect that it allows for the earliest possible detection of completely invisible or completely visible object segments and an associated control in processing the hierarchical data structure. If it is established, for instance, that an object segment is invisible that part of the hierarchical data structure of the object segment is ignored which is at a lower hierarchical level in the inventive method.

Another advantage of the inventive method is the fact that the progressive levels of detail along the object surface need not be invariably determined as early as during the reduction operation but may be variably defined in representation.

In the following, a preferred embodiment of the inventive method will be described with reference to the drawing.

In the drawing:

FIGS. 2b–2j are flow charts showing the individual steps of the inventive method as illustrated in FIG. 2a;

FIGS. 3a, b, c illustrate an example of a surface detail of an object as well as the associated hierarchical data structure and the appertaining memory assignment after execution of the first two steps of the inventive method;

FIGS. 4a, b, c show the surface detail, the appertaining hierarchical data structure, as well as the data stored in the memory after a first iteration of the third and fourth step of the inventive method;

FIGS. 5a, b, c illustrate the surface detail, the associated hierarchical data structure, as well as the data stored in the memory after a second iteration of the third and fourth step of the inventive method;

FIGS. 6a, b, c show the surface detail, the appertaining hierarchical data structure, as well as the data stored in the memory after a fifth step of the inventive method;

FIGS. 7a, b illustrate the set-up surface details as well as the associated data stored in the memory after a first iteration of the sixth, seventh and eighth step of the inventive method;

FIGS. 8a, b show the set-up surface detail as well as the appertaining data stored in the memory after a second iteration of the sixth, seventh and eighth step of the inventive method.

Figure 1A:
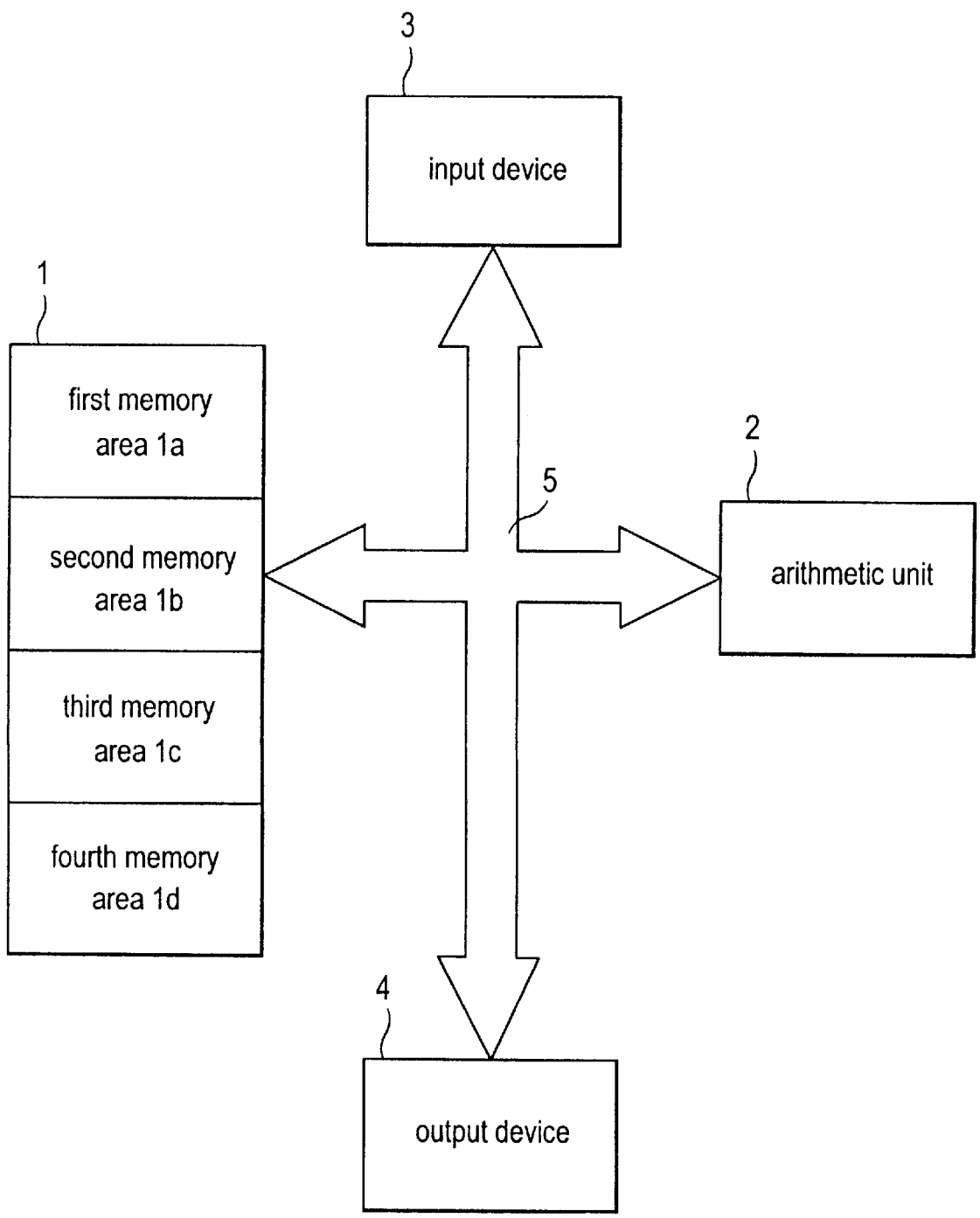
FIG. 1a is a draft-type illustration of a device for implementing the inventive method.

FIG. 1a is a schematic view of the structure of a device for implementing the inventive method. The device comprises a memory 1 which is subdivided into memory areas 1a, 1b, 1c, 1d. The memory 1 is connected via a bus 5 to an arithmetic unit 2, an input device 3 and an output device 4. The bus consists preferably of an address, data and a control bus. The arithmetic or computing unit 2 may be a processor, for instance. The output device 4 is preferably a display screen. The device illustrated in FIG. 1a may also comprise several input devices and output devices. The input device 3 is preferably a keyboard or a mouse for entry of geometric data to display an object.

Figure 1B:
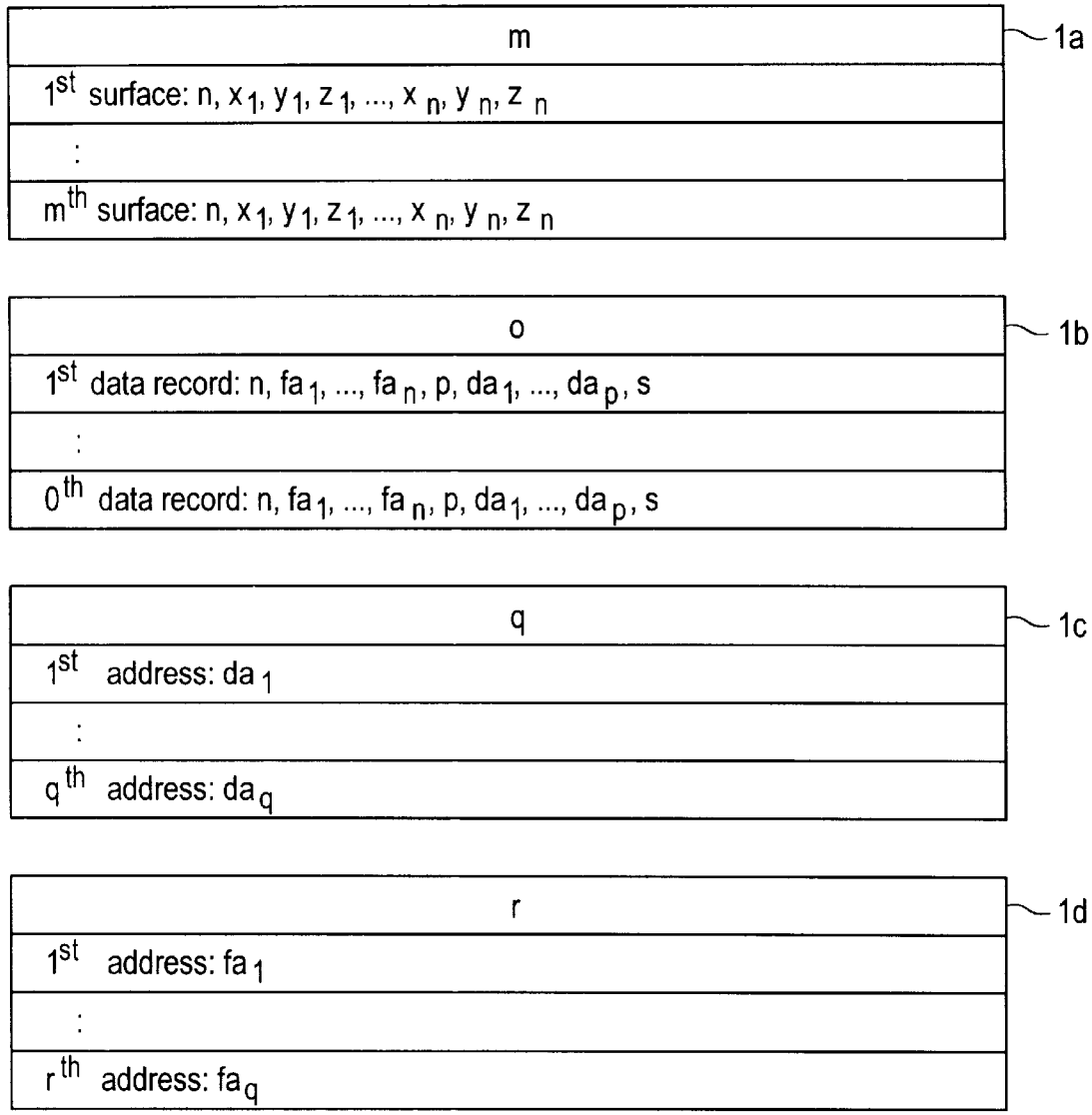
FIG. 1b shows the subdivision of the memory shown in FIG. 1a into four memory areas.

FIG. 1b shows the subdivision of the memory 1 illustrated in FIG. 1a. The memory 1 is subdivided into a first memory area 1a, a second memory area 1b, a third memory area 1c and a fourth memory area 1d.

The first memory area 1a may be used to store surface data elements which form together the object surface of an object to be displayed. The number of stored surface elements m is stored at one address in the memory area 1a. The first to $m^{th}$ surface elements are stored t further addresses in the first memory area 1a. Each of the stored surface data elements reflects first of all the number n of the vertices of a surface. This number n is 3 for triangles, for instance. The surface data element can specify polygons having an optional number of vertices. In addition to the number of vertices of a surface n the co-ordinates x, y, z are stored for all vertices of a surface in each surface data element stored in the first memory area 1a. Each surface data element corresponds to an optional polygon.

Three co-ordinates are stored for each vertex for the representation of three-dimensional objects. For the visual display of two-dimensional objects it is sufficient to store two co-ordinates per vertex.

As is apparent from FIG. 1b m surface data elements are stored in the first memory area 1a, which represent m surfaces of an object. Any object whatsoever may be specified by a fine grid or mesh which may be constituted by a large number of polygons. In a preferred embodiment of the invention the grid is constituted by triangles exclusively. In the case of triangles only the respective co-ordinates of three vertices in a surface data element must be stored.

The memory 1 comprises a second memory area 1b, as may be seen in FIG. 1b. Data records of a hierarchical data structure may be stored in the second memory area 1b. The number of the stored data records o is stored at a first address of the second memory area 1b. The data records are stored in succession at further addresses. Each data record contains a number n reflecting the number of pointer addresses of the data record which refer to surface data elements in the first memory area 1a. In addition, each data record contains the pointer addresses fa which refer to surface data elements in the first memory area 1a. Then follows a number p which reflects the number of the pointer addresses referencing data records in the second memory area 1b. Then join the various pointer addresses da which reference data records in the second memory area 1b. Finally, each data record contains a number S reflecting the reduction level of the data record. The reduction level S reflects the accuracy with which the data record specifies the object surface. The higher the reduction level S the lower the accuracy of representation of the object surface in the data record. The level of detail of the data record stored in the memory area 1b is obtained by subtracting the reduction level s from a maximum reduction level $S_{max}$ possible. The higher the level of detail of a data record the higher the accuracy of specification of the object surface in the data record.

The memory 1 includes a third memory area 1c for storing addresses of data records still pending for processing. To this end the number q of the stored pointer addresses referencing data records pending for processing is stored at a first address of the third memory area 1c. Then join the pointer addresses da which are stored at further addresses of the third memory area 1c and which reference data records pending for processing, which are stored in the second memory area 1b.

The memory 1 includes a fourth memory area 1d where addresses of surface data elements to be output are stored. The number r of the stored pointer addresses referencing surface data elements is stored at a first address of the fourth memory area 1d. Then join the various pointer addresses fa which reference surface data elements in the first memory area 1a. The surface data elements addressed in the fourth memory area of the storage unit 1, which are stored in the memory area 1a, are output to the output device 4 after execution of the method for the geometric display of the object.

Figure 1C:
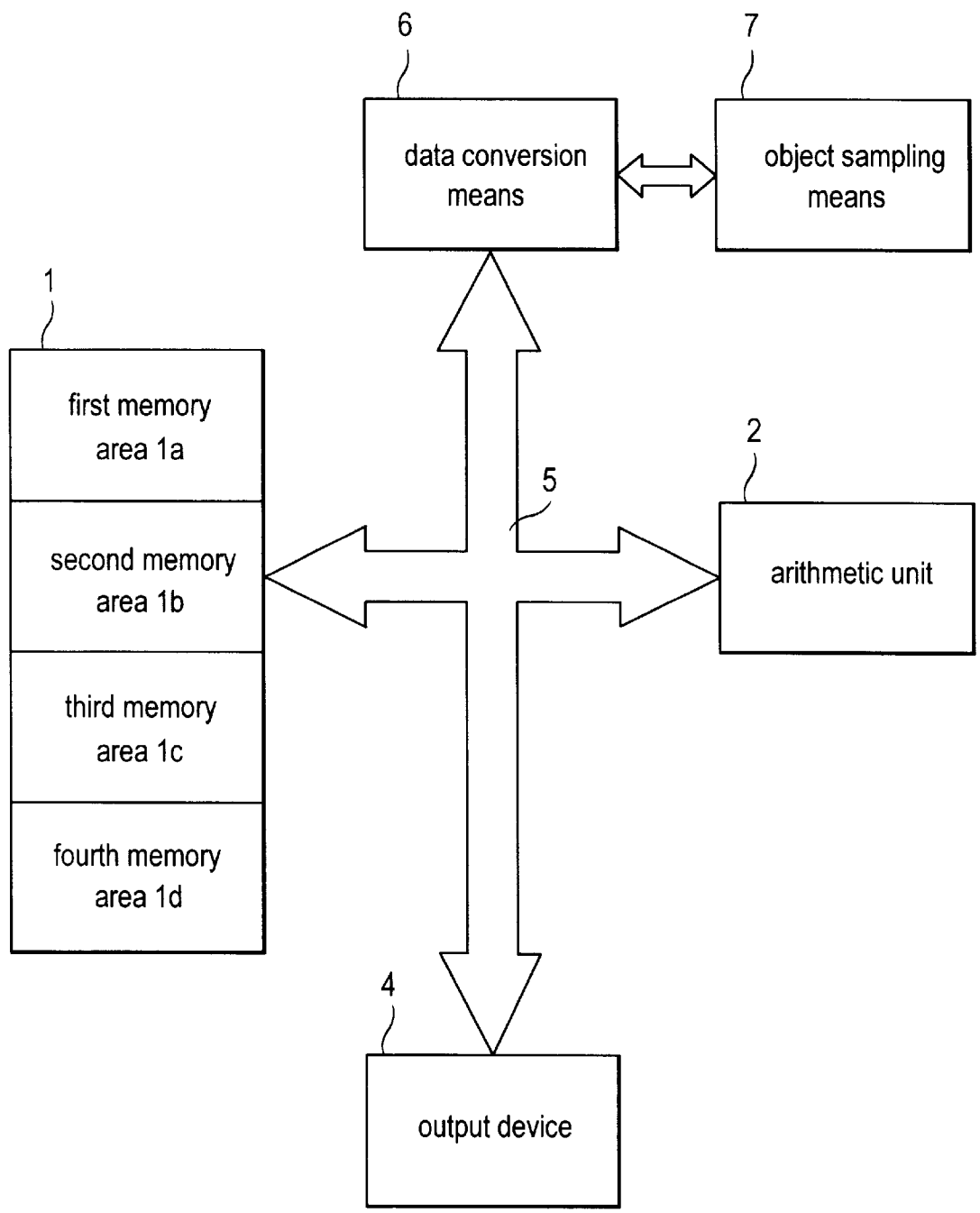
FIG. 1c is a schematic view of a second embodiment of a device for implementing the inventive method.

FIG. 1c illustrates another embodiment of the device for implementing the method. The device shown in FIG. 1a is distinguished from the device illustrated in FIG. 1a by the fact that the input device 3 is replaced by a data conversion module 6 and by an object scanning unit 7. The object scanning unit 7 scans a two- or three-dimensional object to be visually displayed and communicates output data to a data conversion module 6. The data conversion module 6 converts the data output from the object scanning unit 7 into a data format appropriate for the inventive method. This data conversion module 6 preferably outputs the data in a form suitable for being directly stored into the first memory area 1a of the storage unit 1. To this end the data originating from the data conversion module 6 is written via the data bus into the first memory area 1a of the storage unit 1. The object scanning unit 7 may be a scanner, for instance, which scans objects. Three-dimensional structures are scanned, for example, by a laser-assisted scanner or by reconstruction from several photographs. The three-dimensional data may, however, also be generated by radiological computerised tomography or NMR tomography as well as by three-dimensional ultrasonic techniques.

Figure 2A:
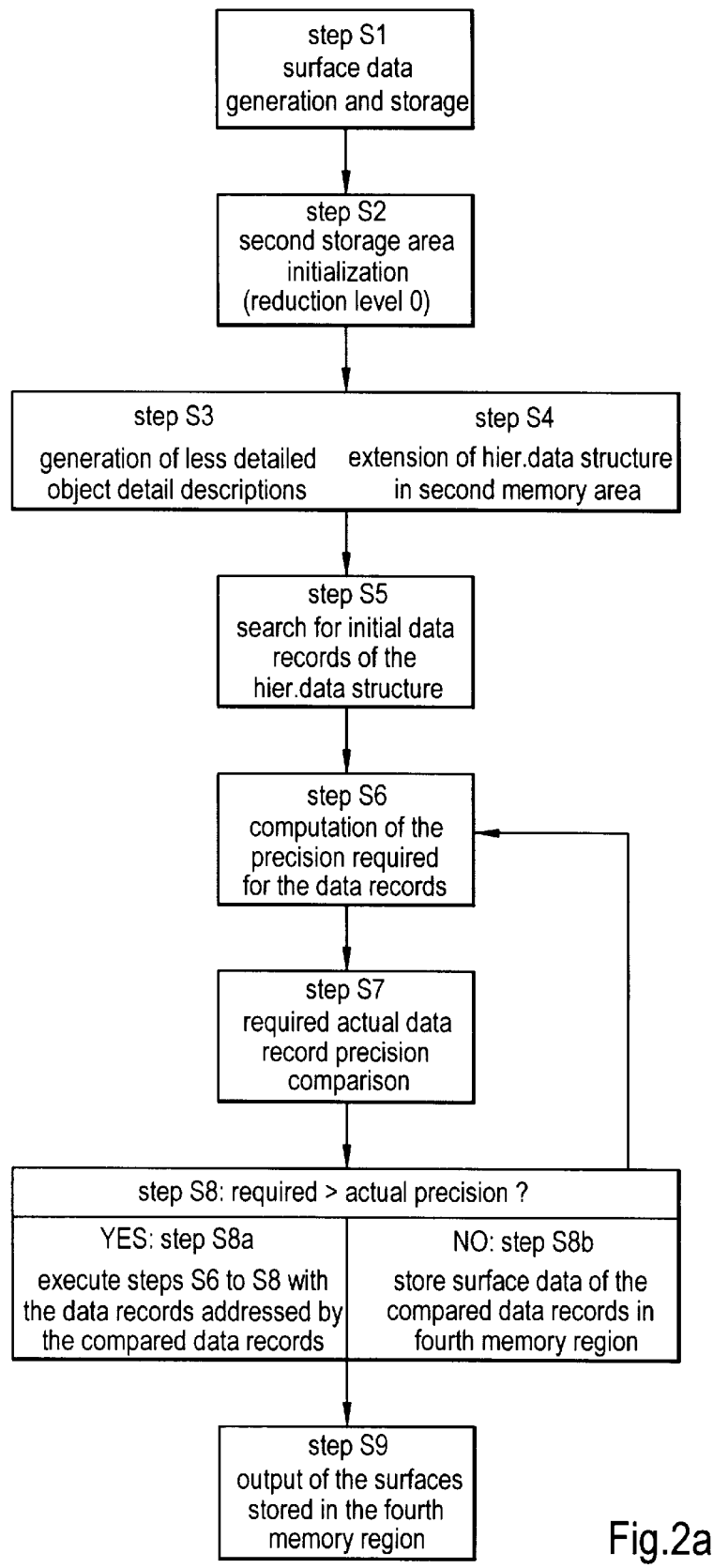
FIG. 2a is a flow chart of the inventive method.

FIG. 2a shows a flow chart representing a general view of the inventive method. The method according to the present invention comprises several steps which will be explained in even more detail with reference to FIGS. 2b to 2j. The inventive method serves to display geometric object surfaces on the output device 4 with a variable level of detail or accuracy.

In the first step S1 of the inventive method surface data of at least one object is generated, and this surface data is stored as the co-ordinates of vertices. The vertices are the vertices of mutually joining surfaces which represent the two- or three-dimensional object. Even objects of a higher dimension, e.g. four-dimensional mathematical objects, may be stored. The coordinates of the vertices are stored as addressable surface data elements in the first memory area 1a of the storage unit 1.

In a second step S2 a data record is generated for each surface data element stored in the first memory area, which record contains a pointer address referencing the respective surface data element and having a reduction level of zero. This data record so generated is stored in the second memory area 1b of the storage unit 1. The second step S2 of the method serves to initialize the second memory area 1b of the storage unit 1. Then a third and a fourth step S3, S4 of the method are executed in parallel. In the third step S3 additional surface data elements are generated and stored in the first memory area 1a for the representation of object segments with a reduced level of detail. In this operation the level of detail of the object surface representation is reduced, which means that the object is specified at a reduced accuracy.

In a fourth step S4, parallel with the third step S3, a hierarchical data structure with several data records addressable via pointer addresses is stored in the second memory area 1b of the storage unit 1, which data records serve to display one segment of the object surface with a specified level of detail. In this operation each data record stores at least one pointer address referencing surface data elements for a specification of an object segment, pointer addresses referencing further data records with a higher level of detail, and the own level of detail of the respective data record. The data records with a higher level of detail, which are referenced by the pointer addresses, represent altogether the identical part of the object surface like the data record as such.

In the following fifth step S5 of the inventive method the pointer addresses of those data records stored in the second memory area 1b which are not referenced by any of the pointer addresses stored in other data records and which specify altogether the object of the lowest level of detail in its entirety are stored in a third memory area 1c of the storage unit 1.

In a sixth step S6 a minimum level of detail is computed in the arithmetic unit 2 for the representation of the object segment which is specified by the data records. The minimum level of detail is computed on the basis of various criteria, so-called LOD (level of detail) criteria. These are criteria which relate to the three-dimensional relationship between the object to be displayed and the observer viewing the object to be displayed. For instance, the distance between the observer and the object or the size of the object may be employed as criterion in display. Other criteria may be the position of the object on an output screen or the position of the object either in the centre of the observer's visual field or at the periphery of the field of vision. The arithmetic unit 2 of the device executes a LOD computation process to determine the required minimum accuracy at which the object is to be displayed.

In a seventh step S7 of the method the computed minimum level of detail of each data record having an address stored in the third memory area 1c is compared against the level of detail stored in the data record.

Then the result of the comparison so determined for each data record whose address is stored in the third memory area 1c is evaluated.

Depending on the result of the comparison so determined either the surface data of the compared data record are copied into the fourth memory area id in an eighth step S8 of the inventive method, or the sixth, seventh and eight steps S6 to S8 are executed with the data records addressed by the compared data record. When the stored level of detail of the compared data record is at least equal to the computed minimum level of detail the pointer addressed referencing surface data elements, which are stored in the compared data record, are copied into the fourth memory area 1d of the storage unit 1. When, however, the stored level of detail of the compared data record is smaller than the computed minimum level of detail the pointer addressed referencing data records and stored in the compared data record are copied into the third memory area 1c.

In both cases the pointer address referencing the compared data record is then erased in the third memory area 1c.

In a ninth step S9 of the inventive method the surface data elements addressed in the fourth memory area 1d of the storage unit 1 are communicated to the output device 4 for a geometric display of the object. The output device 4 then displays the object with the required level of detail. The required accuracy is determined by the optionally selectable LOD criteria.

Figure 2B:
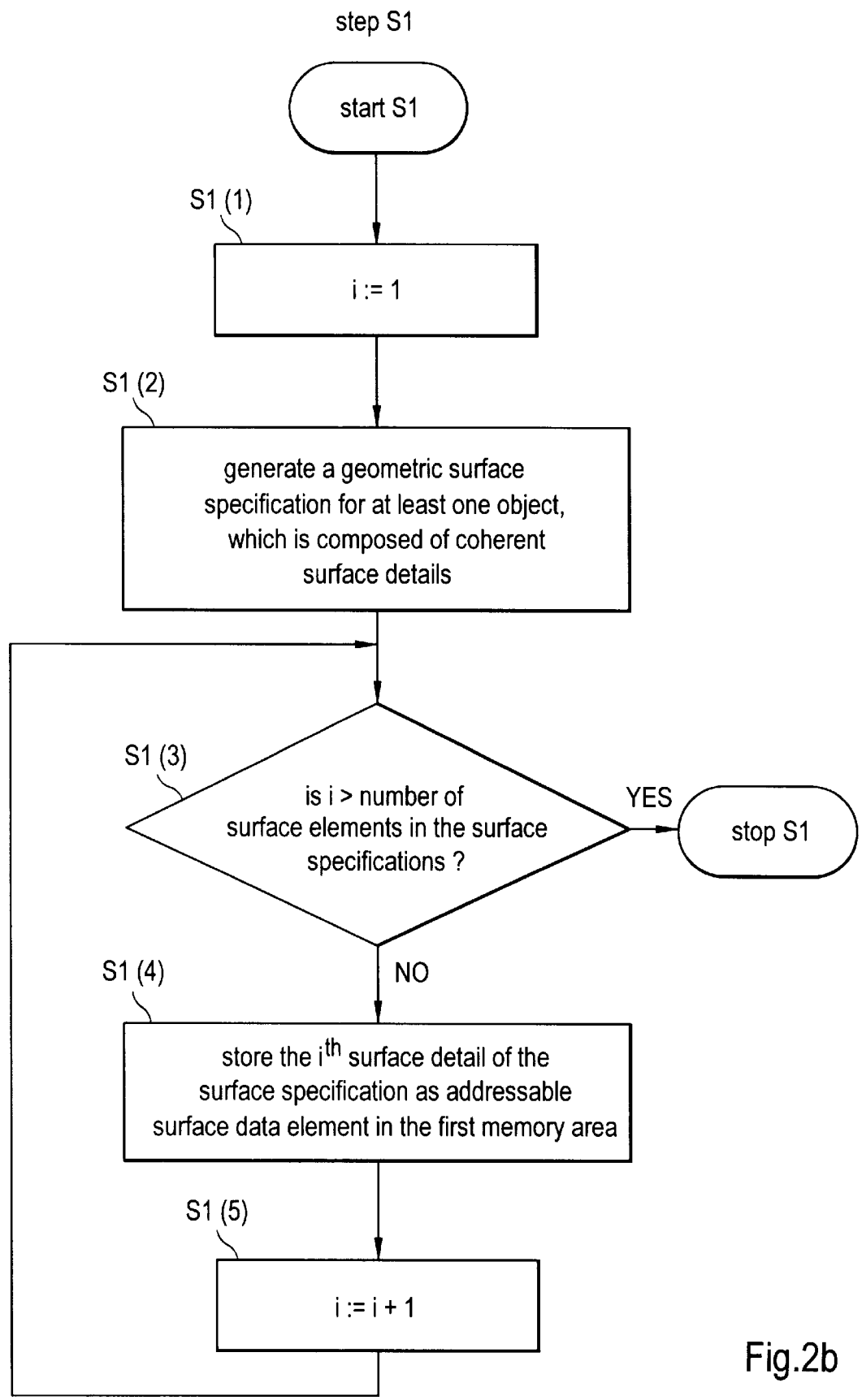

FIG. 2b shows the step S1 illustrated in FIG. 2a in detail. In step S1 the surface data of an object is generated and stored in a first memory area 1a as co-ordinates of vertices of mutually joining addressable surface data elements which altogether form the object surface. To this end, initially a counter i is set to one in a sub-step S1 (1). Then geometric surface specification of at least one object composed of mutually joining surface segments is generated in a sub-step S1 (2). In a third sub-step S1 (3) the counter i is compared against the number of surface segments in the surface specification. If the count i is greater than the number of surface segments in the surface specification the $i^{th}$ surface segment of the surface specification is stored as addressable surface data element in the first memory area 1a in a sub-step S1 (4). Thereupon the count is incremented by one in a fifth sub-step S1 (5) and the programme returns to the third sub-step S1 (3). The loop S1 (3), S1 (4), S1 (5) is repeated until i is greater than the number of the surface segments in the surface specification.

Figure 2C:
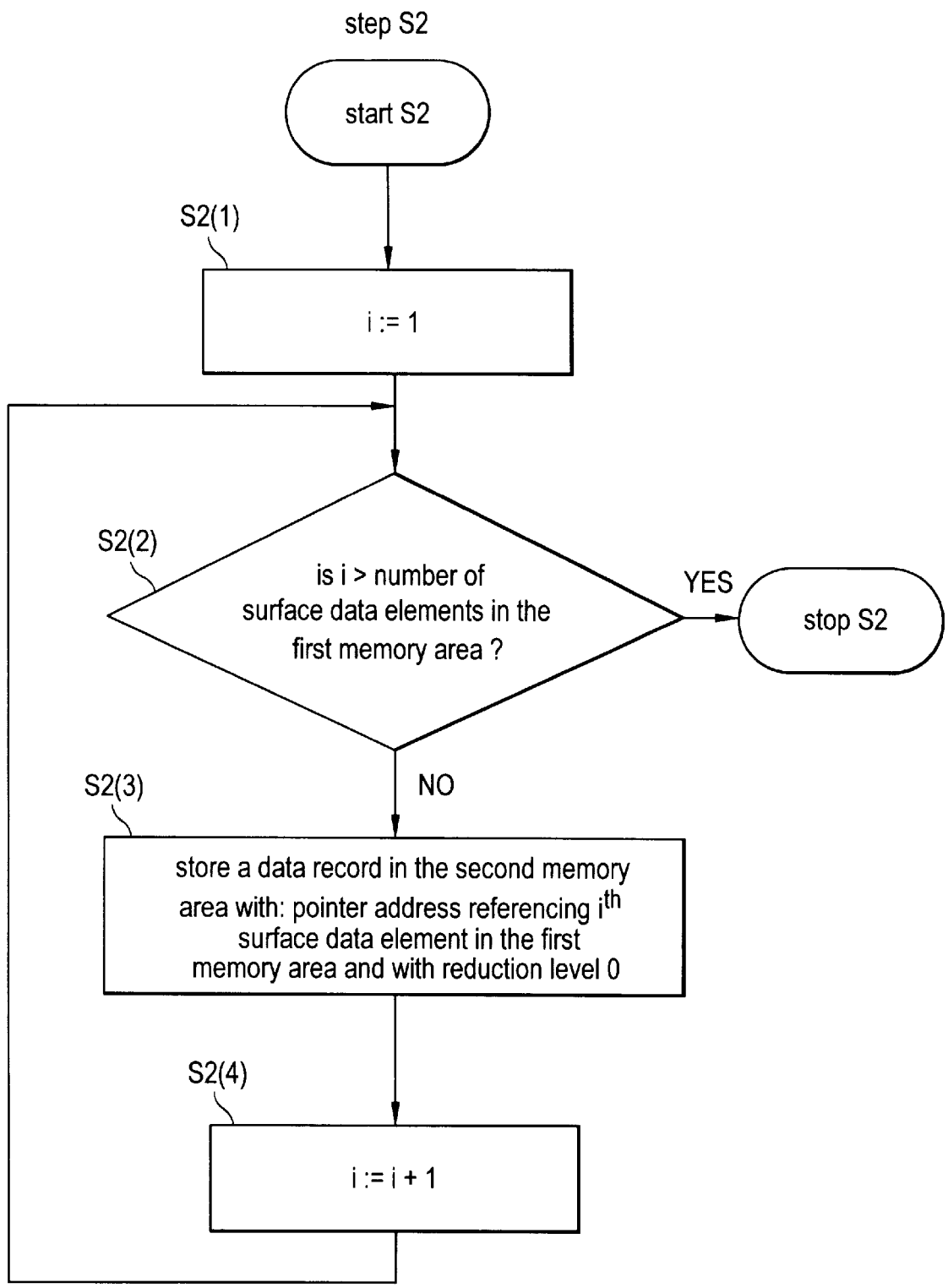

FIG. 2c shows the second step S2 of the inventive method in detail. In the second step S2 of the inventive method a data record containing a pointer address referencing the respective surface data element and having a reduction level of zero is generated for each surface data element stored in the first memory area 1a, and the data record is stored in a second memory area 1b of the storage unit 1. To this end a counter is set to one in a first sub-step S2 (1). Then the count is compared against the number of surface data elements in the first memory area 1a in a second sub-step S2 (2). If the count is, however, smaller than the number of the surface data elements in the first memory area 1a the data record is stored in the second memory area 1b. The data record contains a pointer address referencing the $i^{th}$ data element in the first memory area 1a as well as a number indicating that the reduction level is zero. Then the counter is incremented in a fourth sub-step S2 (4) and the loop S2 (2), S2 (3) as well as S2 (4) is repeated until the count is greater than the number of surface data elements in the first memory area 1a. FIG. 3 shows the situation after execution of steps S1 and S2 of the inventive method.

FIG. 3a shows a plain surface detail of an object to be displayed. The surface segment shown in FIG. 3a, which is merely intended to serve as an illustrative example of the method, is composed of twelve triangles. Each of the illustrated twelve triangles presents three vertices. The surface segment shown in FIG. 3a is two-dimensional so that each vertex of the triangles may be represented by two co-ordinates. If, for instance, the origin of the co-ordinate system is located at the left bottom end of the illustrated surface detail the three vertices of the first triangle 1 have the following co-ordinates, for instance: the first vertices have the co-ordinates (0, 1), the second vertex has the co-ordinates (0, 2) and the third vertex has the co-ordinates (1, 2). All polygons or triangles of the object surface may thus be represented by the co-ordinates the vertices in this manner.

FIG. 3b illustrates the hierarchical data structure of the surface segment roughly drafted in FIG. 3a. The hierarchical data structure comprises twelve elements consecutively numbered from 1 to 12, with each element containing an information about the reduction level in addition to the pointer address of the respective surface data element. The twelve elements of the hierarchical data structure in the illustrated example present each a reduction level of zero. This means that the surface representation has so far not yet been reduced, in other words, that the surface of the object is displayed with a maximum level of detail.

FIG. 3c shows the stored data after execution of the first and second steps S1, S2 of the inventive method for the object shown in FIG. 3a. The surface data of the object are stored as co-ordinates of the vertices in the first memory area 1a of the memory. At the first address 0000 of the first memory area 1a the number of surface data elements stored is specified. In the illustrated example twelve surface data elements are stored in the first memory area 1a. The various surface data elements 1 to 12 are stored at the following addresses 0001 to 0012 of the first memory area 1a. Each surface data element corresponds exactly to one surface. In the surface data element the number of the vertices n of the surface n is stored, together with the co-ordinates of these vertices. The surface data element 12 is stored, for instance, at the address 0012 of the memory area 1a, with the surface data element 12 forming a triangular surface. Hence the number of the vertices n of the surface 12 is three. Then follow the Cartesian co-ordinates of the three vertices of the surface 12.

Apart from Cartesian co-ordinates any other co-ordinate system may be employed as desired for implementing the method, such as polar co-ordinates.

After the surface data has been stored one respective data record is generated in the second step S2 of the method for all the stored surface data elements; this data record contains a pointer address referencing the respective surface data element and presenting a reduction level of zero. Then this data record is stored in the second memory area 1b of the storage unit 1.

As becomes apparent from FIG. 3c, the number of data records is stored at the address 0000 of the second memory area 1b. This number becomes 12 initially as one data record 1 to 12 is generated respectively for each surface data element 1 to 12. The first data record is stored at the address 0001 of the second memory area 1b. Each data record stored in the second memory area 1b contains a number which reflects the number of the pointer addresses of the data record which reference surface data elements in the first memory area 1a. For instance, the data record 1 stored at address 0001 of the memory area 1b merely contains a pointer address 0001 referencing the surface data element 1 in the first memory area 1a. Therefore, the number of pointer addresses referencing surface data elements in the first memory area is one. This indication is follows by a number in each data record, which reflects the number of pointer addresses referencing data records in the second memory area 1b. For instance, after execution of the first two steps of the method the data record 1 has no pointer address referencing data records in the second memory area 1b. Hence the number p, which indicates the number of pointer addresses referencing data records in the second memory area 1b, is zero. Finally, the data record reduction level is stored in each data record. The reduction level s of the data record 1 is zero, for example.

The data record 1 in the second memory area 1b has a reduction level of 0, which means that the data record 1 specifies the object with a maximum level of detail. After the second step of the inventive method all the stored data records have a reduction level 0. The second step of the method serves to initialize the second memory area. The third memory area 1c as well as the fourth memory area 1d of the storage unit are still empty after the first two steps of the inventive method, as is illustrated in FIG. 3c.

After completion of the second step the third and fourth steps of the method are executed in parallel in accordance with FIG. 2a.

Figure 2D:
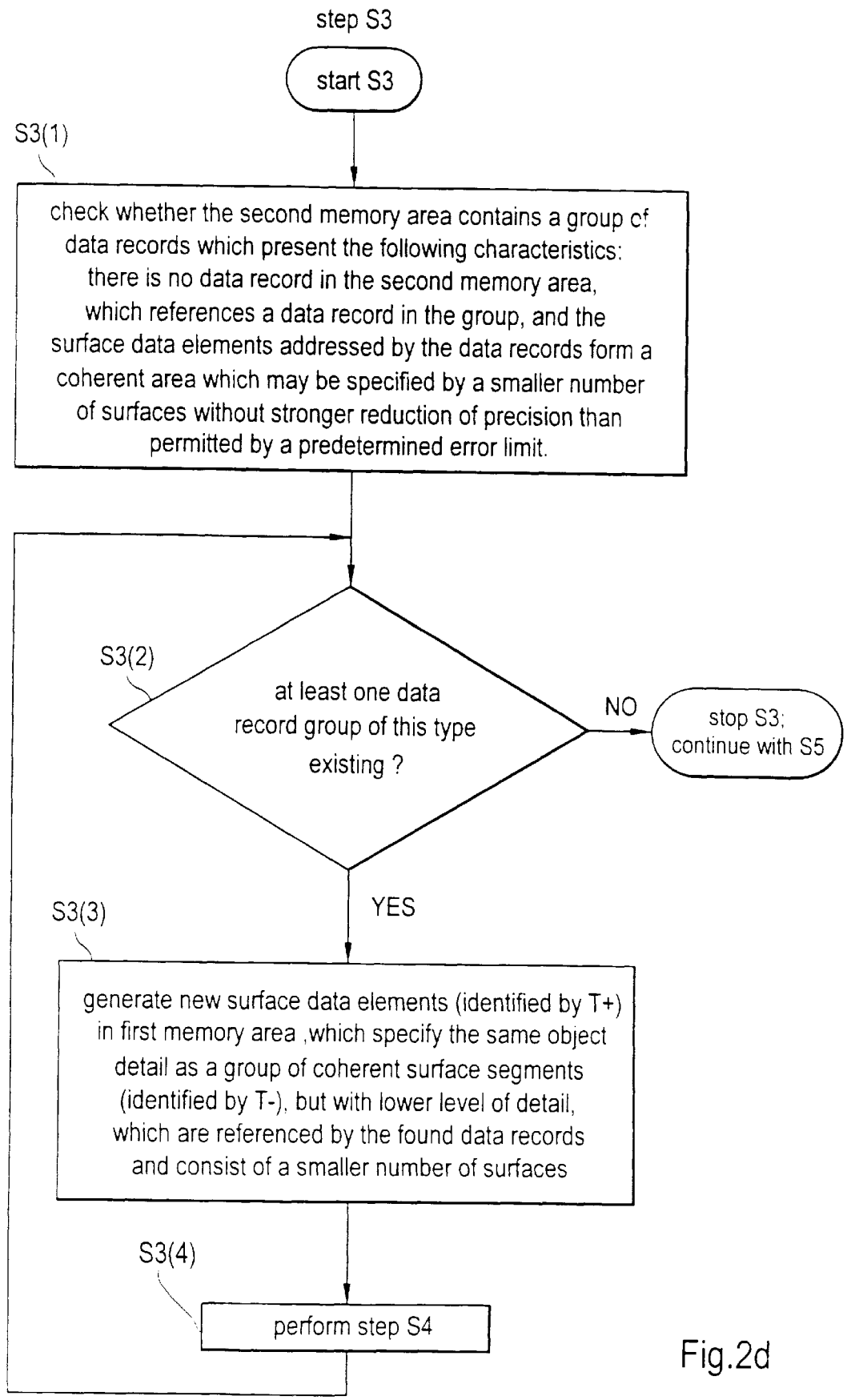

FIG. 2d shows the third step S3 of the inventive method in detail. In the third step S3 additional surface elements for representation of the object with a reduced level of detail, i.e. with a higher reduction level, are generated and stored in the first memory area 1a, with a reduction of the level of detail of the surface representation. To this end, a check is performed in a first sub-step S3 (1) to determine whether a group of data records exists in the second memory area 1b which comply with specific properties. It is checked whether there is no data record in the second memory area 1b which references the data record of the group, and whether the surface elements addressed by the data records constitute a coherent area which may be specified by a small number of surfaces, without a stronger reduction of the level of detail than permitted by a predetermined error limit.

In a second sub-step S3 (2) a check is made to determine whether at least one such group of data records exists. If there is no group of this kind step S3 is completed and the programme arrives at step S4.

If, however, there is such a group of data records new surface data elements are generated in the first memory area 1a in a third sub-step S3 (3), which specify the same object segment with a level of detail lower than the level of detail of a group of coherent surface segments referenced by the found data records and consisting of a smaller number of surfaces. The sub-step S3 (4), to perform step S4, follows sub-step S3 (3).

T⁻ denotes a first group of coherence surface data elements in the first memory area 1a, which altogether specify a particular surface segment at a specific level of detail.

T⁺ denotes a second group of equally coherent surface data elements in the first memory area 1a which altogether specify the identical surface segment as well as the group T⁻, however, with a level of detail lower than the level of group T⁻, with the number of the surface data elements of group T⁺ being smaller than the number of surface data elements of group T⁻.

M designates a set of data records in the second memory area 1b which contain pointer addresses referencing surface data elements of group T⁻ in the first memory area 1a which, in their turn, are not referenced by any pointer addresses of other data records in the second memory area 1b.

Figure 2E:
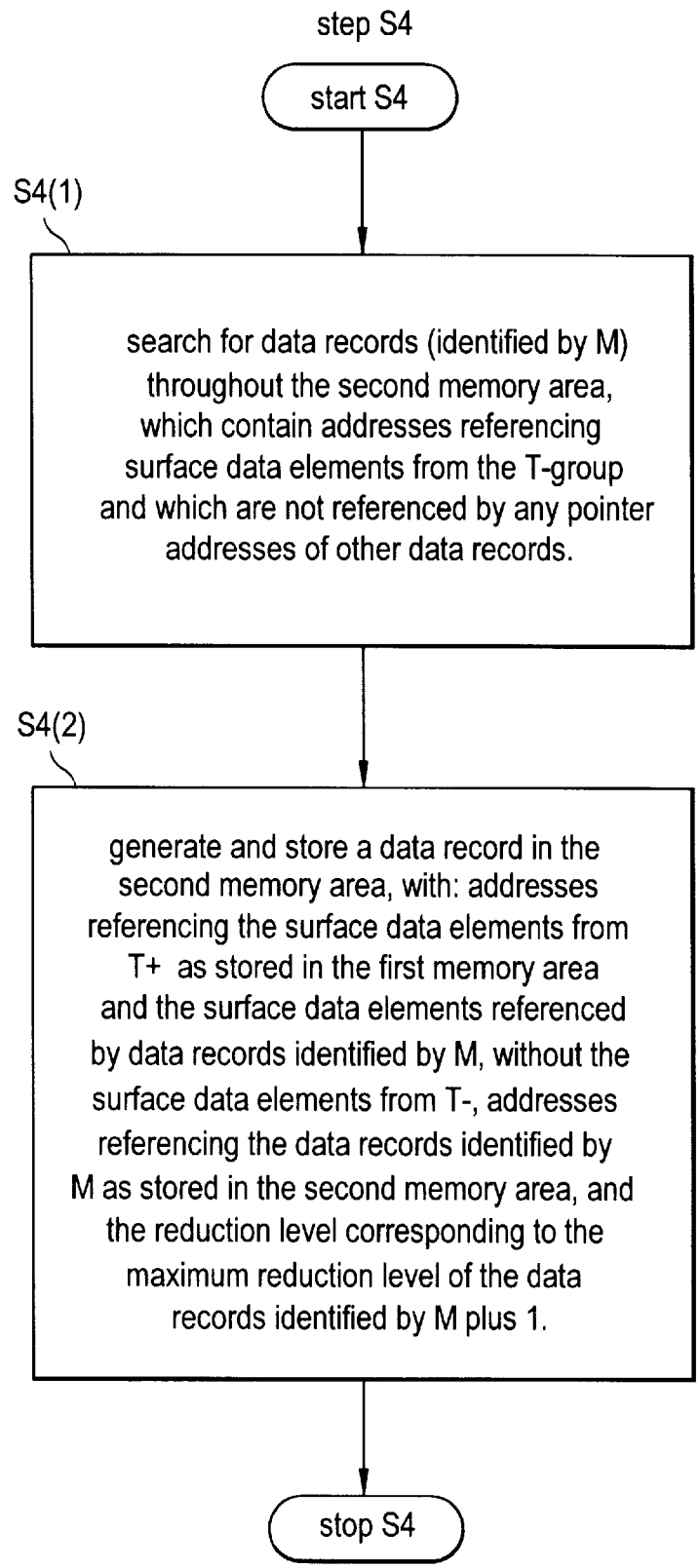

FIG. 2e shows the step S4 of the inventive method which is executed in parallel with the step S3. In a first sub-step S4 (1) a search is performed in the second memory area 1b of the storage unit 1 to find data records which contain pointer addresses referencing surface data elements from group T⁻ and which are not referenced by any pointer addresses of other data records. In a second sub-step S4 (2) a data record is generated and stored in the second memory area 1b, which data record contains pointer addresses referencing the surface data elements from group T⁺ as stored in the first memory area and referencing surface data elements referenced by data records indicated by M, without the surface data elements from group T⁻. Moreover, the data record stored in the second memory area 1b contains pointer addresses referencing the data records stored in the second memory area 1b, which are identified by M, and the reduction level. The reduction level corresponds to the maximum reduction level of the data records identified by M, plus one. Hence a hierarchical data structure is established in the fourth step of the inventive method.

FIG. 4 illustrates the memory allocation in the case of this example after execution of a first iteration of steps S3 and S4 of the inventive method.

FIG. 4a is the illustration of the exemplary surface detail after execution of a first reduction step.

FIG. 4b shows the hierarchical data structure shown in FIG. 3b, equally after execution of a first iteration of steps 3 and 4 of the inventive method.

FIG. 4c shows the corresponding changes of the data in the first and second memory areas of the storage unit after completion of a first iteration of the third and fourth steps in accordance with the inventive method.

As is apparent in FIG. 4a, the surface of the object to be displayed is represented with a reduced level of detail. The surface segment which had been represented by the triangles 2, 3, 4, 7, 8 of FIG. 3a is now specified by the triangles 13, 14, 15 as well as 16. The number of the triangles has hence been reduced. The remaining triangles 1, 10, 5, 6, 11, 12 have remained unchanged, compared against FIG. 3a.

FIG. 4b illustrates the hierarchical data structure after execution of the first iteration of steps 3 and 4 of the inventive method. The data structure, which was originally composed of 12 elements, has been extended by one element. This element comprises the surfaces 12, 13, 14, 15 as well as a respective pointer referencing the elements 2, 3, 4, 7, 8, 9 of a lower reduction level. The added data structure element has a reduction level increased by 1. The pointer illustrated in the added data structure element reflects symbolically addresses referencing data structure elements at a hierarchically subordinate level. The surface segment specified by the new element, which is described by the triangles 13, 14, 15, 16, is identical with the surface segment specified by the surfaces 2, 3, 4, 7, 8, 9.

FIG. 4c is an illustration of the data stored in the storage unit 1 after completion of the first iteration of the third and fourth steps in accordance with the present invention. As is evident from FIG. 4c, the number of the surface data elements stored in the first memory area has been increased by four. This increase corresponds to the number of the added triangles 13, 14, 15, 16. These surfaces 13, 14, 15, 16 are additionally stored in the first memory area 1a of the storage unit 1 as surface data elements 13 to 16. In the example illustrated in FIG. 4c the surface data element 13 is stored, for instance, at the address 0013 in the first memory area 1a. As compared against the condition illustrated in FIG. 3c, the number of data records in the second memory area 1b of the storage unit 1 has equally been increased, specifically by one. This corresponds to the number of the added data structure elements, as is shown in FIG. 4b. In FIG. 4 a data structure element, which comprises the surfaces 13, 14, 15 and 16, has been added. Accordingly, an additional data record 13 is stored in the second memory area 1b of the storage unit at the address 0013 of the second memory area. The data record 13 first of all reflects the number of pointer addresses referencing surface data elements in the first memory area 1a. In this case these are four surface data elements, in correspondence with the four surfaces 13, 14, 15 and 16. These four surfaces are stored at the addresses 0013 to 0016 in the first memory area 1a of the storage unit 1. These four addresses are equally stored in the data record 13 as pointer or reference addresses. They are joined by the indication of the number of the pointer addresses referencing data records in the second memory area 1b. In the illustrated example of the data record 13 this number is 13. This means that the data record 13 has six pointer addresses referencing-six other data records within the second memory area 1b, with these data records altogether specifying the same surface area as the data record 13. In the example shown in FIG. 4c the data record 13 has six pointer addresses 0002, 0003, 0004, 0007, 0008, 0009 referencing the data records 2, 3, 4, 7, 8 and 9 in the second memory area 1b. The data record 13 specifies the identical surface segment for the data records it references, however, with a reduced level of detail or with a higher reduction level. The reduction level of the data record is higher by one than the reduction level of the data records it references. For instance, the data records 2, 3, 4, 7, 8, 9 have a reduction level of zero whereas the data record 13, which stores pointer addresses referencing these data records, has a reduction level of one.

FIG. 5 illustrates the situation after execution of a second iteration of steps 3 and 4 of the inventive method for the case of this example.

FIG. 5a illustrates the surface segment shown in FIG. 4a after a second reduction step.

FIG. 5b is the illustration of the corresponding hierarchical data structure. On account of the reduction a further data structure element has been added which encompasses the surfaces 13, 14, 7, 18, 19 shown in FIG. 5a. This fourteenth data structure element includes pointers referencing the thirteenth data structure element as well as the data structure elements 5, 6, 10 and 11. The surface segment specified by the surfaces 13, 14, 17, 18, 19 hence corresponds to the total of the area defined by the thirteenth data structure element plus the area composed of the triangles 5, 6, 10, 11, as represented in FIG. 4a. The additional fourteenth data structure element, which corresponds to data record 14 in the second memory area, has a reduction level of two. This means that the level of detail of the surface specification has been reduced another time or that the level of detail has been reduced by one.

The number of the data records in the second memory area 1b of the storage unit 1 has equally been increased, specifically by one. This corresponds to the added data structure element having the reduction level two. This data structure element is stored as data record 14 at the address 0014 in the second memory area 1b. The number of the pointer addresses referencing surface data elements in the first memory area 1 is five in the added data record 14. These addresses are 0013, 0014, 0017, 0018, 0019 in the first memory area 1a. These addresses correspond to the five triangles 13, 14, 17, 18, 19 composing the fourteenth data structure element. The number p of pointer addresses referencing data records in the second memory area 1b is equally five in the data record 14. These are the addresses 0005, 0005, 0019, 0011, 0013 in the second memory area 1b. These are the addresses of those data records which are referenced by the data record or the data structure element, respectively. The pointer address 0013 in the data record 14 equally references the address 0013 by which the data record 13 is stored. This data record 13 in ist turn references six data records in the second memory area 1b, inter alia e.g. the data record 2 at the address 0002 in the second memory area 1b. Hence the data record 14 references data records with the lowest reduction level of zero in an indirectly concatenated form via pointer addresses.

Figure 2F:
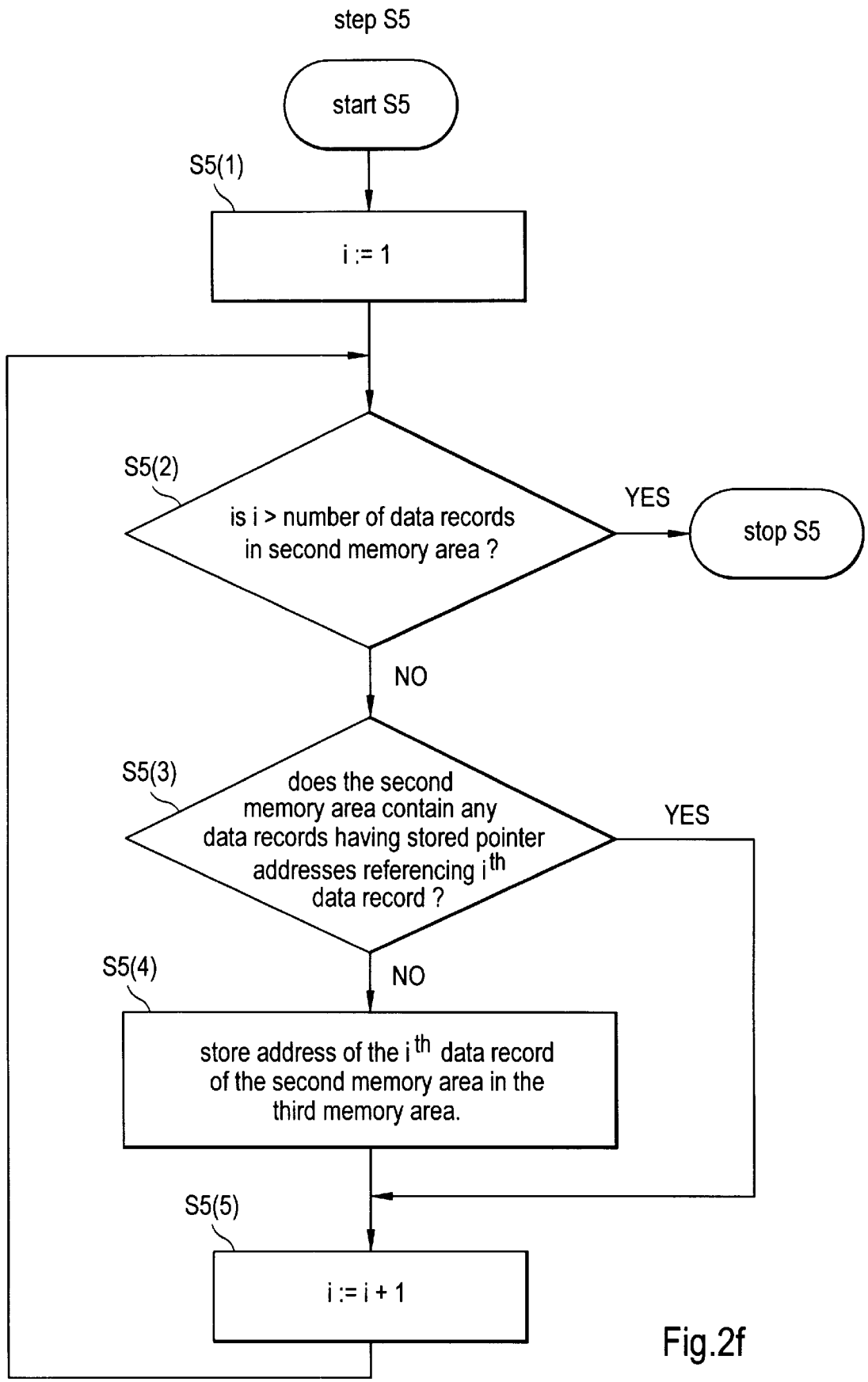

FIG. 2f shows the fifth step S5 in the inventive method in detail. In the fifth step S5 a search is performed to find the initial data records for evaluation of the hierarchical data structure. In a first sub-step S5(1) a counter is set to one. In an inquiry S5(2) a check is made to determine whether the count exceeds the number of the data records in the second memory area 1b. If the count is higher the step S5 is completed. If the count is smaller than or equals the number of the data records in the second memory area 1b a second inquiry S5(3) is performed to determine whether there are data records in the second memory area 1b whose stored pointer addresses reference the $i^{th}$ data record. If there is no data record of this type the address of the found data record of the second memory area 1b, which is not referenced by a pointer address, is stored in the third memory area 1c in a next sub-step S5(4). If the second inquiry S5(3) furnishes, however, the result that there is a data record in the second memory area 1b whose stored pointer addresses reference the examined data record the sub-step S5(4) is by-passed and the programme arrives directly at the next sub-step S5(5) at which the counter is incremented by one. The programme runs through the loop consisting of the sub-steps S5(2), S5(3), S5(4) and S5(5) for all data records in the second memory area 1b, i.e. until the count equals the number 0 of stored data records in the memory area 1b. In the fifth step S5 of the method hence the addresses of those data records are copied into the third memory area 1c which are not referenced by a pointer in the hierarchical structure diagram.

FIGS. 6a, b, c illustrate the situation after execution of the fifth step S5 of the inventive method. Compared against the surface detail after execution of the third and fourth steps, as illustrated in FIG. 5a, the surface detail shown in FIG. 6a has not changed. Accordingly, the hierarchical data structure as shown in FIG. 6b has remained unchanged, compared against the data structure shown in FIG. 5b. As is apparent from FIG. 6c the data in the first memory area 1a as well as in the second memory area 1b of the storage unit are not changed by the step S5. After completion of the fifth step S5 of the inventive method, the pointer addresses of those data records in the second memory area 1b are written into the memory area 1c so far empty which are not referenced by any pointer addresses in the second memory area 1b. This corresponds at the same time to those data records in the hierarchical data structure diagram which are not referenced by a pointer. As is immediately obvious from FIG. 5b, for instance, the data records not referenced by another data record are the records 1, 12 and 14. These data records have the addresses 0001, 0012 and 0014, as may be seen in FIG. 5c. These three addresses of the second memory area 1b are copied into the third memory area 1c of the storage unit 1 after completion of the fifth step S5 of the inventive method. The number of the pointer addresses stored in the third memory area and referencing data records in the second memory area 1b is stored at the first memory address 0000 of the third memory area 1c. In the case of this example these are three addresses.

Figure 2G:
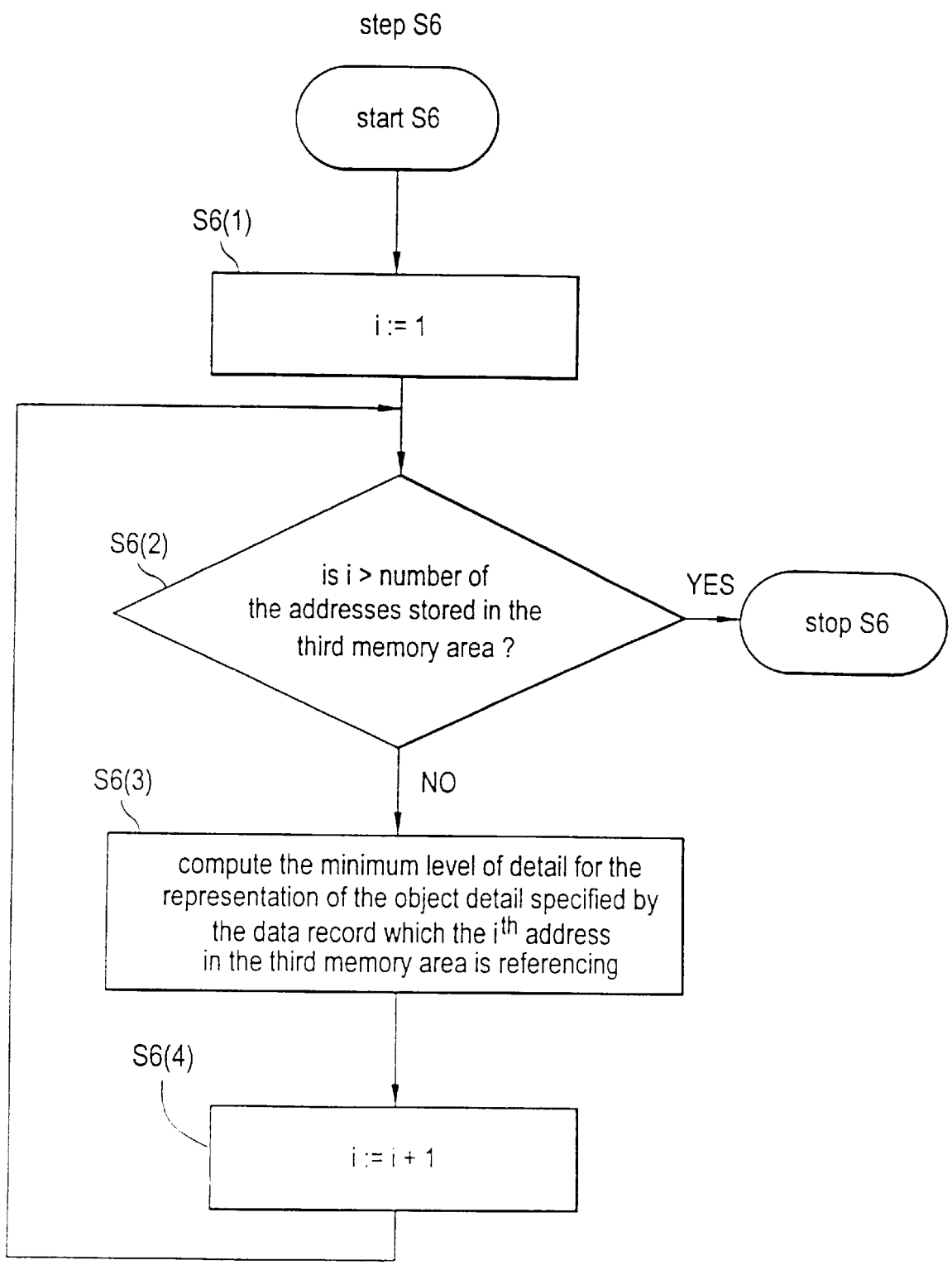

FIG. 2g shows the sixth step S6 of the inventive method in detail. In the sixth step S6 a minimum level of detail for the representation of the object is computed in the arithmetic unit 2. In a first sub-step S6(1) a counter is set to 1. Then an inquiry S6(2) is made to determine whether the count exceeds the number of the addresses stored in the third memory area 1c. If the count is greater the programme arrives at the end of step S6. If, however, the count is smaller or equal the minimum level of detail for the representation of the object segment is computed which is specified by the data record referenced by the $i^{th}$ address in the third memory area 1c. The minimum level of detail is computed, S6(3), in compliance with so-called LOD criteria which may be determined optionally. These LOD criteria may be the distance between the object segment and the observer or the position of the object segment on an output screen, for instance. The majority of the LOD criteria is dynamic, which means that the criteria vary continuously along the object surface. The LOD (level of detail) criteria determine a level of accuracy demanded from the object to the displayed. For instance, a LOD criterion may consist in the aspect that a maximum accuracy of representation of those object segments is demanded in the visual display of the object which are located in the centre of the observer's field of vision. After step S6(3), step S6(4) increments counter i and the program returns to step S6(2). In the sixth step of the inventive method, which is illustrated in FIG. 2f, therefore the required minimum level of detail is computed for each data record whose address is stored in the third memory area 1c of the storage unit 1.

Figure 2H:
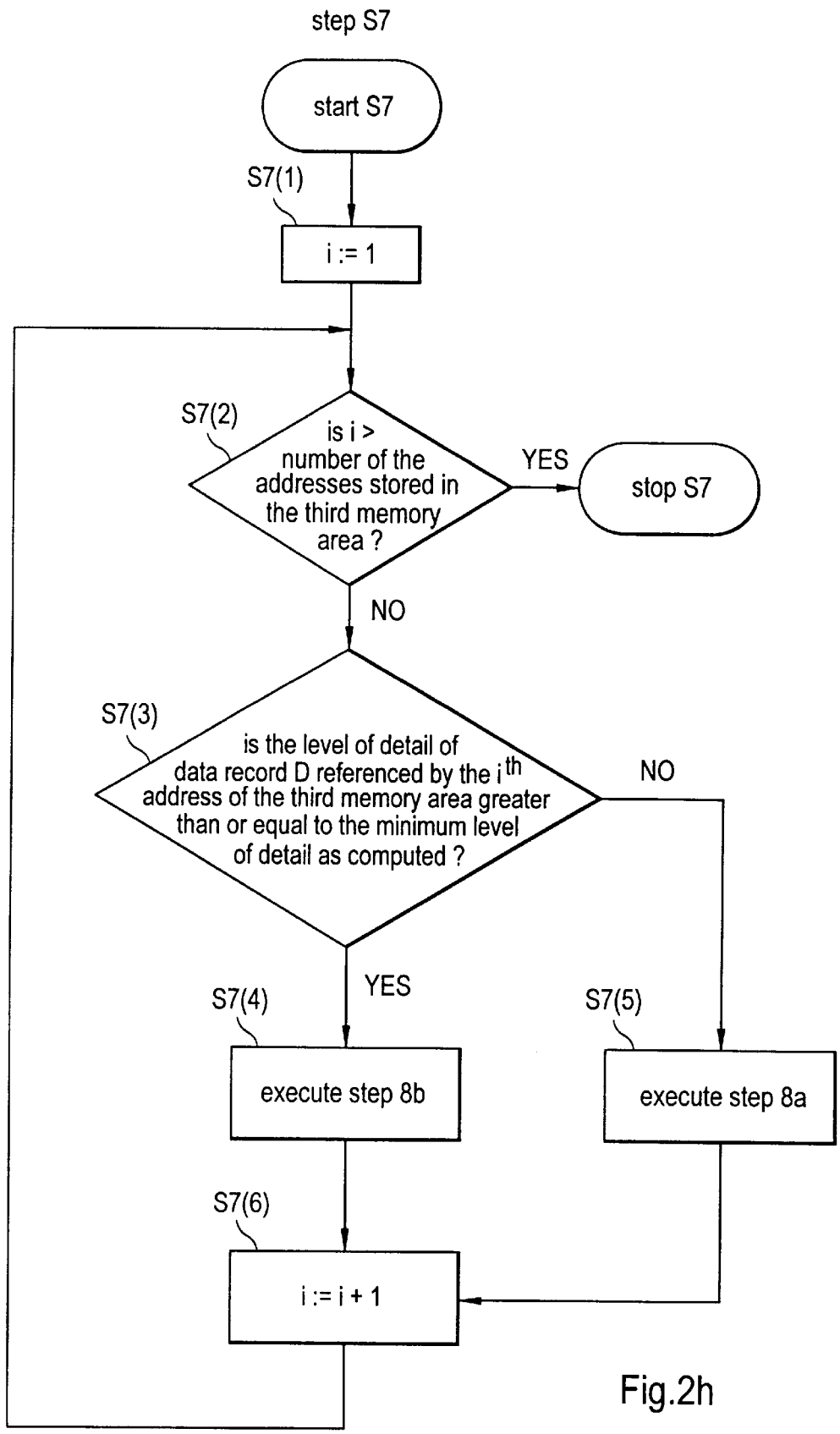
Figure 2J:
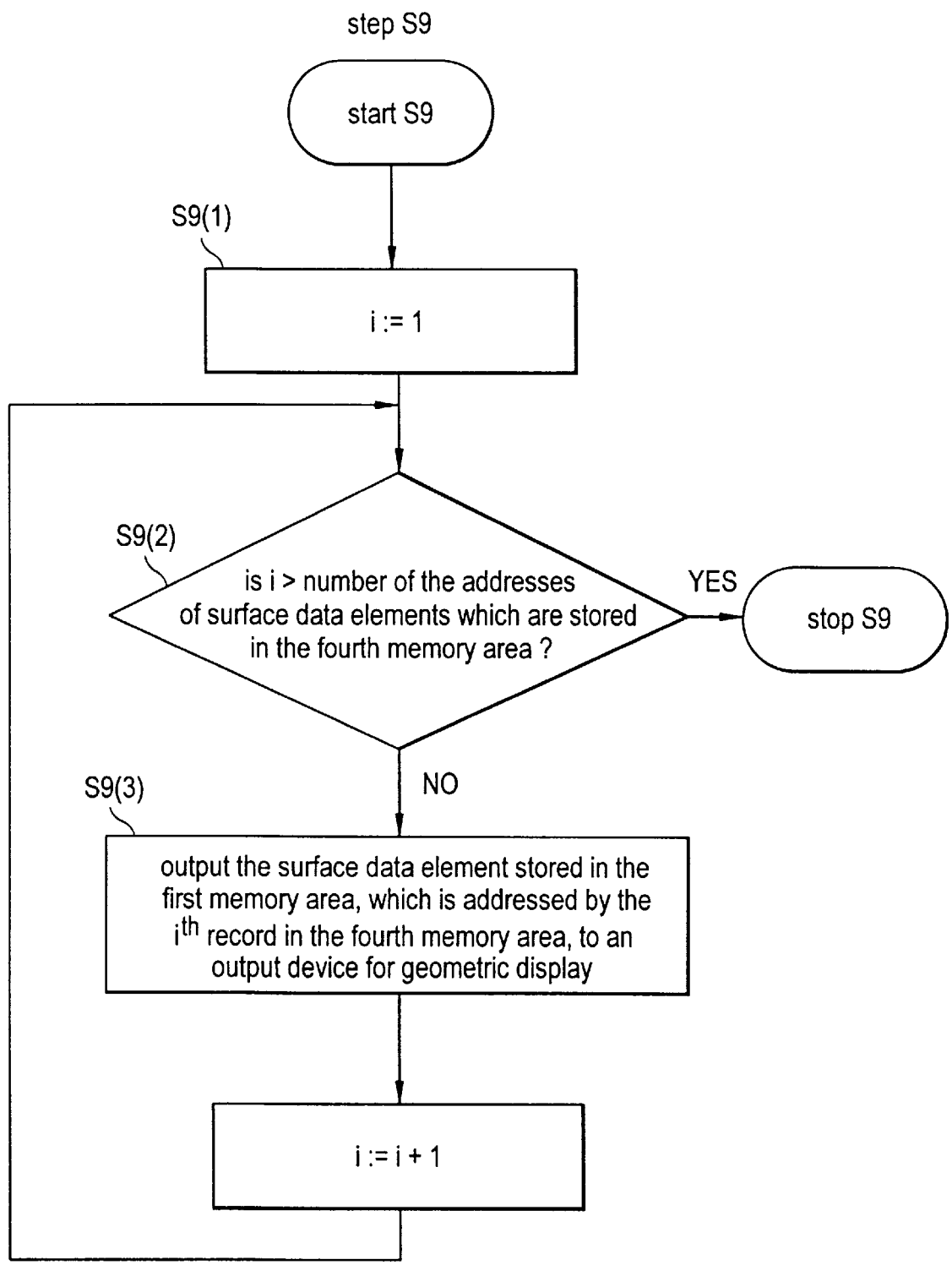

Subsequently to the sixth step of the method the computed required minimum level of detail of each data record is compared against the level of detail stored in the data record in the seventh step S7 of the inventive method, as it is illustrated in FIG. 2h. Each data record of the second memory area 1b stores the reduction level of the data record. The level of detail of the data record may be computed from the reduction level of the data record by subtracting the stored reduction level from a maximum reduction level. This computed level of detail of the data record is then compared with the required minimum level of detail as computed in step S6. In the seventh step of the method, in a first sub-step S7(1), a counter is set to one. In a second sub-step S7(2) a check is made to determine whether the count exceeds the number of the addresses stored in the third memory area 1c. If the count is greater the programme arrives at the end of the seventh step S7. If the count is smaller than or equal to the number of the addresses stored in the third memory area 1c a next inquiry S7(3) is performed to determine whether the level of detail of that data record which is referenced by the $i^{th}$ address of the third memory area 1c is higher than the computed minimum level of detail. If the level of detail of the data record is lower the programme arrives at the sub-step S7(4) in which the step 8a, which is illustrated in FIG. 2i, is executed. If the level of detail of the data record is, however, higher or equal in the inquiry S7(3) the programme arrives at the sub-step S7(5) in which the step 8b is executed which is illustrated in FIG. 2i. Then the counter is incremented by one in a next sub-step S7(6) and the programme executes the loop S7(2), S7(3), S7(4) or S7(5) as well as S7(6) until all the addressed stored in the third memory area 1c have been processed.

FIG. 2i shows the sub-steps S7(4) and S7(5) as illustrated in FIG. 2h in detail. In step 8a, which is performed at sub-step S7(5), addresses are copied into the third memory area 1c. The pointer addresses of a data record for which it has been determined in sub-step S7(3) that its level of detail is lower than the minimum level of detail computed for this record are then copied into the third memory area 1c. As is apparent from FIG. 2i the step 8a equally comprises two sub-steps. In a first sub-step S8a(1) a counter j is set to one. Then an inquiry is performed to establish whether the count j exceeds the number of the pointer addresses stored in the data record, which reference data records. If the count j is greater than the number the programme arrives directly at the sub-step S8(5). If the count j is smaller than or equal to the number of the pointer addresses stored in the data record the $j^{th}$ pointer address stored in the data record D, which references data records in the second memory area 1b, is copied into the third memory area 1c. Then the counter j is incremented by one in a sub-step S8a(4). The programme executes the loop S8a(2), S8a(3), S8a(4) until all the pointer addresses stored in the data record have been copied into the third memory area 1c.

As is apparent from FIG. 2i the step 8b equally comprises several sub-steps. In a sub-step S8b(1) a counter j is set to one. An inquiry is then performed to check whether the count j exceeds the number of the pointer addresses recorded in the data record D, which reference surface data elements. If the count j is higher than the number the programme arrives directly at sub-step S8(5). If the count j is smaller than or equal to the number of the pointer addresses referencing surface data elements, which are stored in D, the programme continues with substep S8b(3). In this sub-step the $j^{th}$ pointer address referencing surface data elements, which is stored i D, is copied into the fourth memory area 1d. Then the counter j is incremented by one in a sub-step S8b(4). The programme loops through steps S8b(2), S8b(3) as well as S8b(4) until all the pointer addresses referencing surface data elements, which are stored in the data record D, have been copied into the fourth memory area 1d.

Finally, the pointer address referencing the data record D in the third memory area 1c is erased in sub-step S8(5) and after the end of step 8 the programme arrives at the sub-step S7(6) shown in FIG. 2h.

FIGS. 7a, b show the situation after execution of a first iteration of steps S6, S7, S8 of the inventive method.

FIG. 7a shows the set-up surface detail, i.e. the surfaces which are referenced by the pointer addresses of surface data elements in the first memory area 1c, which are stored in the fourth memory area 4d.

FIG. 7b images the data stored in the storage unit 1. The data in the first memory area 1a as well as in the second memory area 1b is not changed by the execution of steps S6 to S8 of the method, which means that in the case of this example it is identical with the data as represented in FIG. 5c. The steps S6 to S8, however, changes the data in the third memory area 1c and in the fourth memory area 1d. The set-up surface detail as shown in FIG. 7a corresponds to the surface data element 1 and the surface data element 12 whose pointer address is stored in the memory area 1d, as becomes apparent from FIG. 7b.

In the situation shown in FIG. 7 it has been assumed that the required minimum level of detail of the data record 1 and the data record 12, which is computed in step S6 of the method, is smaller than their actually stored level of detail and that the computed required level of detail of the data record 14 is higher than the level of detail of the data record 14, which is actually stored.

A view at the initial situation before execution of the first iteration of the steps S6 to S8 in the hierarchical data structure diagram, as it is illustrated in FIG. 6b, reveals that the data record 14 has a reduction level of 2, the data record 13 has a reduction level of 1, and the data records 1 to 12 have each a reduction level of zero. The level of detail of the data records is a result of the subtraction of the stored reduction level from a maximum reduction level. On the assumption that the maximum reduction level is 2, for instance, a level of detail of zero is obtained for the data record 14, and a level of detail of one for the data record 13 and a level of detail of two for the data records 1 to 12. The data records 1 to 12 hence indicate the surface having the maximum level of detail. In the initial situation prior to execution of the first iteration of the steps S6 to S7 three pointer addresses, i.e. 0001, 0012, 0014, which reference the data records 1, 12 and 14 in the second memory area 1b, are stored in the third memory area 1c in the case of this example. Examples of these data records are illustrated in FIG. 5c.

In the first step S6, including sub-steps shown in FIG. 2g the required minimum level of detail is computed for each data record which is referenced by a pointer address in the third memory area 1c. The case of the example is based on the assumption that the computed minimum level of detail is one for all of the three data records 1, 12, 14, which means that the computing step S6(3) according to FIG. 2g furnishes a result of one for each of the data records 1, 12, 14. A check is made in step S7 as shown in FIG. 2h for all three data records 1, 12, 14 stored in the third memory area 1c to determine whether the level of detail of the respective data record exceeds the computed minimum level of detail. The reduction level of the data record 1 is zero, for instance, which means that ist level is detail is two if a maximum reduction level of 2 is assumed. Hence the inquiry in step S7(3) furnishes the result for the data record 1 that the data record has a higher level of detail than the required minimum level of detail. Therefore, the step S7(4) is executed for this data record, and the step 8b as illustrated in FIG. 2h is performed. The pointer addresses referencing surface data elements in the first memory area 1a, which are stored in the data record 1, are therefore copied into the fourth memory area 1d in step S8b(3). As may be seen in FIG. 5c, for instance, the data record 1 has merely one pointer address 0001 which references the surface data element 1 in the memory area 1a. This pointer address is copied into the fourth memory area 1d, as becomes apparent from FIG. 7b. The same operation is performed with the data record 12.

With respect to the data record 14 the inquiry in step S7(3) furnishes the result that the level of detail of the data record is smaller than the computed minimum level of detail. The data record 14 has a reduction level of two, as is apparent, for instance, from FIG. 6b. If a maximum reduction level of two is assumed hence a level of detail of zero is obtained, which means that the data record 14 specifies the surface with a lower level of detail than data record 13 or the data records 1 to 12, for instance. On the assumption that the minimum level of detail as computed for the data record 14 in step S6(3) is zero the inquiry in step S7(3) furnishes the result that the level of detail of the data record, which is zero, is smaller than the computed required minimum level of detail of one. Hence the sub-step S7(5) leads to step 8a in FIG. 2i for the data record 14. The data record 14 has five pointer addresses referencing data records in the second memory area 1b. These pointer addresses referencing data records in the second memory area 1b, i.e. 0005, 0006, 0010, 0011, 0013, are copied into the third memory area 1c in sub-step S8a(3), as is shown in FIG. 7b.

Finally the programme arrives at step S8(5) for all data records 1, 12, 14 processed in the first iterating step, at which the pointer addresses referencing the data records in the third memory area 1c are erased. As is apparent from FIG. 7b the pointer addresses 0001, 0012, 0014 referencing the data records 1, 12, 14 are erased from the third memory area 1c. After execution of step S8(5) the programme arrives at step S7(6) in FIG. 2h at which the counter i of step S7 is incremented by one.

In a second iteration those data records are now processed whose pointer addresses are stored in the third memory area 1c. According to FIG. 7b these are the data records 5, 6, 10, 11, 13. The data records 5, 6, 10, 11 have a level of detail of two and the data record 13 has a level of detail of one. On the assumption that the computed required level of detail is one for all data records the inquiry in step S7(3) leads to the substep S7(4) for all data records, and for none of the data records to step S7(5). In sub-step S7(4) the step 8b is performed, i.e. the pointer addresses referencing surface data elements in the first memory area 1a, which are stored in the data record, are copied into the fourth memory area 1d. For instance, the pointer addresses 0013, 0014, 0015, 0016 of the data record 13, which reference the surface data elements 13, 14, 15, 16 in the first memory area, pointer addresses 0001, 0012, 0014 referencing the data records 1, 12, 14 are erased from the third memory area 1c. After execution of the step S8(5) the programme arrives at step S7(6) in FIG. 2h at which the pointer addresses in the third memory area 1c, which reference the data records 5, 6, 10, 11, 13, are erased. Therefore the third memory area 1c is empty after the second iteration of steps S6 to S8 in accordance with the example.

In a last step S9 of the inventive method the surface data elements addressed in the fourth memory area 1d of the storage unit 1 are output to the output device 4 for the geometric display of the object. In a first step S9(1) a counter i is set to one. Then an inquiry is performed S9(2) to establish whether the counter i exceeds the number of addresses of surface data elements which are stored in the fourth memory array. If the count i is greater than the number of addresses, the program arrives at the end of step S9. If, however, the count i is smaller than the number of the addresses of surface data elements stored in the fourth memory array, the surface data element stored in the first memory area, which is addressed by the $i^{th}$ record in the fourth memory area, is output to an output device for geometric S9(3). In accordance with FIG. 8a and 8b the surface data elements stored in the fourth memory area 1d are output to the output device 4. In the case of this example these are the surface data elements 1, 12 as well as the surface data elements 5, 6, 10, 11, 13, 14, 15, 16.

A comparison of FIGS. 3a and 8a reveals that the original surface representation with surfaces 1 to 12 has been replaced by the surface representation according to FIG. 8a which includes the surfaces 1, 5, 7, 10, 11, 12, 13, 14, 15. Even though the level of detail of the surface representation has been reduced it is still sufficient in view of the computed required level of detail. After execution of the method hence a representation of the geometric object is generated which satisfies the accuracy demands in terms of the LOD criteria.

The aforedescribed method may be expediently employed in a very great number of specific fields in computer graphics. Typical potential applications are computer-generated 3-D displays such as simulation and visualisation. Apart therefrom there are other possible applications in spheres other than computer graphics, e.g. rapid prototyping.

Particularly in the medical field the inventive method may be efficiently employed. The method according to the present invention is appropriate for use in combination with any type of imaging method suitable to generate three-dimensional images of the interior of a person's body in a non-invasive manner. The most common medical methods are radiological computerized tomography, computer-assisted and NMR tomography as well as 3-D ultrasonic techniques.

In non-medical applications, too, three-dimensional scanning techniques are applied which may be combined with the inventive method. Examples of such applications are the measurement and check of parts critical in terms of wear, e.g. in the production of aeroplanes and motor vehicles, on the basis of laser-assisted scanning techniques or flight simulations with geotypical or geospecific landscape data generated from images produced from satellites.

The inventive method permits the variation of the accuracy of real-time approximation along the surface of geometric objects. With the inventive method any reduction steps performed for given object segments are cancelled until a desired or required level of detail has been restored. To this end a hierarchical data structure is established during the reduction operation. Expressed in simplified terms, this hierarchical data structure stores the specific triangles which may be used to display isolated parts of the object with different levels of detail. Then the suitable level of detail may be selected for the display or output of the object for each object segment. The inventive method permits the achievement of a significant object complexity and simultaneously the display or output of relevant object segments with a maximum of accuracy. To this end the graduation of the level of detail along the surface need not be invariably determined as early as in the course of the reduction process but may rather be variably defined by the time of display. The inventive method may be combined with various techniques for simplifying geometric surfaces. These methods of simplifying geometric surfaces, however, must be an iterative and locally operative method. Techniques which compute entirely new surface specifications are not suitable.

We claim:

1. Method of displaying geometric object surfaces with a variable level of detail on an output device (4), which comprises the following steps:

generating surface data of at least one object and storing the surface data in a first memory area (1a), generating data records for all surface data stored in said first memory area (1a) and storing the data records in a second memory area (1b), generating additional surface data for the representation of object segments with a lower level of detail and storing same in said first memory area (1a), and generating and storing a hierarchical data structure with several data records addressable via pointer addresses for the representation of one part of the object surface, as well as a specified level of detail in a second memory area (1b), storing the pointer addresses of those data records stored in said second memory area (1b) which are not referenced by any pointer addresses stored in other data records, computing a minimum level of detail for the representation of the object segment in an arithmetic unit (2), comparing the computed minimum level of detail for each data record whose address is stored in said third memory area (1c), with the level of detail stored in the data record, evaluating the results of the comparison for each data record, with the pointer addresses referencing surface data elements of data records having a stored level of detail which is at least equal to the computed minimum level of detail being copied into a fourth memory area (1d) and with the pointer addresses stored in the other data records being copied into said third memory area (1c), and erasing the pointer addresses referencing the data record from said third memory area (1c), and output of the surface data elements addressed in said fourth memory area (1d) to the output device (4) for the geometric display of the object.

2. Method of displaying geometric object surfaces with a variable level of detail on an output device (4), which comprises the following steps:

generating surface data of at least one object and storing the surface data as co-ordinates of vertices of contiguous addressable surface data elements, which constitute altogether the object surface, in a first memory area (1a) of a storage unit (1), generating one respective data record, which contains a pointer address referencing the respective surface data element and has a reduction level of zero, for all surface data elements stored in said first memory area (1a) and storing the data record in a second memory area (1b) of said storage unit (1), generating additional surface data elements for the representation of object segments with a lower level of detail and storing same in said first memory area (1a), with the level of detail of the object surface representation being reduced, and in parallel generating and storing a hierarchical data structure of data records addressable via pointer addresses for the representation of one part of the object surface with a specified level of detail in a second memory area (1b) of said storage unit, with each data record storing at least one pointer address referencing memory areas of surface data elements for specification of an object segment, pointer addresses referencing further data records involving a higher level of detail, which altogether represent the identical part of the object surface, and its own level of detail, storing the pointer addresses of those data records stored in said second memory area (1b) which are not referenced by any pointer addresses stored in other data records and which altogether specify the object in ist entirety with the lowest level of detail, in a third memory area (1c) of said storage unit (1), computing a minimum level of detail for the representation of the object segment specified by the data records whose addresses are stored in said third memory area (1c), in an arithmetic unit (2), comparing the computed minimum level of detail for each data record whose address is stored in said third memory area (1c), with the level of detail stored in the data record, evaluating the results of the comparison for each data record whose address is stored in said third memory area (1c), with the pointer addresses referencing surface data elements of data records having a stored level of detail which is at least equal to the computed minimum level of detail being copied into a fourth memory area (1d) of said storage unit (1) and with the pointer addresses stored in the other data records being copied into said third memory area (1c), erasing the pointer address referencing the data record from said third memory area (1c) of said storage unit, and output of the surface data elements addressed in said fourth memory area (1d) of said storage unit to an output device (4) for the geometric display of the object.

3. Method according to claim 2, wherein said addressable surface data elements contain the co-ordinates of vertices of a polygon surface.

4. Method of displaying geometric object surfaces with a variable level of detail on an output device (4), which comprises the following steps:

generating surface data of at least one object and storing the surface data as co-ordinates of vertices of contiguous addressable surface data elements, which constitute altogether the object surface, in a first memory area (1a) of a storage unit (1), generating one respective data record, which contains a pointer address referencing the respective surface data element and has a reduction level of zero, for all surface data elements stored in said first memory area (1a) and storing the data record in a second memory area (1b) of said storage unit (1), generating additional surface data elements for the representation of object segments with a lower level of detail and storing same in said first memory area (1a), with the level of detail of the object surface representation being reduced, and in parallel generating and storing a hierarchical data structure of data records addressable via pointer addresses for the representation of one part of the object surface with a specified level of detail in a second memory area (1b) of said storage unit, with each data record storing at least one pointer address referencing memory areas of surface data elements for specification of an object segment, pointer addresses referencing further data records involving a higher level of detail, which altogether represent the identical part of the object surface, and its own level of detail, storing the pointer addresses of those data records stored in said second memory area (1b) which are not referenced by any pointer addresses stored in other data records and which altogether specify the object in ist entirety with the lowest level of detail, in a third memory area (1c) of said storage unit (1), computing a minimum level of detail for the representation of the object segment specified by the data records whose addresses are stored in said third memory area (1c), in an arithmetic unit (2), comparing the computed minimum level of detail for each data record whose address is stored in said third memory area (1c), with the level of detail stored in the data record, evaluating the results of the comparison for each data record whose address is stored in said third memory area (1c), with the pointer addresses referencing surface data elements of data records having a stored level of detail which is at least equal to the computed minimum level of detail being copied into a fourth memory area (1d) of said storage unit (1) and with the pointer addresses stored in the other data records being copied into said third memory area (1c), erasing the pointer address referencing the data record from said third memory area (1c) of said storage unit, and output of the surface data elements addressed in said fourth memory area (1d) of said storage unit to an output device (4) for the geometric display of the object, wherein said addressable surface data elements contain the co-ordinates of vertices of a polygon surface, and wherein said polygon surfaces are triangles having three vertices.

5. Method according to claim 2, characterised in that said addressable surface data elements are addressable by names or numbers.

6. Method according to claim 1, characterised in that the generation of the surface data is implemented by data conversion of the output data by means of an object scanning unit (7) in a data conversion module (6).

7. Method according to claim 2, characterised in that the generation of the surface data is implemented by data conversion of the output data by means of an object scanning unit (7) in a data conversion module (6).

8. Method according to claim 1, characterised in that the generation of the surface data is implemented by designing a geometric object in an input device (3).

9. Method according to claim 2, characterised in that the generation of the surface data is implemented by designing a geometric object in an input device (3).

10. Method according to claim 1, characterised in that a minimum level of detail is computed for the representations of the object segment on the basis of criteria which may be entered.

11. Method according to claim 2, characterised in that a minimum level of detail is computed for the representations of the object segment on the basis of criteria which may be entered.

* * * * *